United States Patent [19]

Suzuki et al.

[11] Patent Number: 4,502,354
[45] Date of Patent: Mar. 5, 1985

[54] HYDRAULIC PRESSURE CONTROL SYSTEM FOR AUTOMATIC TRANSMISSION

[75] Inventors: Tadashi Suzuki; Norimasa Kishi, both of Yokosuka, Japan

[73] Assignee: Nissan Motor Company, Limited, Yokohama, Japan

[21] Appl. No.: 298,609

[22] Filed: Sep. 2, 1981

[30] Foreign Application Priority Data

Sep. 4, 1980 [JP] Japan .............................. 55-121797

[51] Int. Cl.³ ............................................. B60K 41/06
[52] U.S. Cl. ...................................... 74/866; 74/867; 74/865; 74/752 A
[58] Field of Search ................. 74/861, 862, 863, 864, 74/866, 868, 869, 752 A

[56] References Cited

U.S. PATENT DOCUMENTS

| | | | |
|---|---|---|---|
| 3,640,156 | 2/1972 | Mori et al. | 74/866 |
| 3,680,410 | 8/1972 | Sumiyoshi et al. | 74/866 |
| 3,710,630 | 1/1973 | Sumiyoashi et al. | 74/752 A |
| 3,710,651 | 1/1973 | Marumo et al. | 74/866 |
| 3,738,199 | 6/1973 | Kubo et al. | 74/869 |
| 3,748,926 | 7/1973 | Mohri et al. | 74/866 |
| 3,752,015 | 8/1973 | Murakami | 74/869 |
| 3,855,880 | 12/1974 | Ishimaru et al. | 74/868 |
| 3,871,250 | 3/1975 | Miyauchi et al. | 74/869 |
| 4,106,368 | 8/1978 | Ivey | 74/866 |
| 4,283,970 | 8/1981 | Vukovich | 74/861 |

FOREIGN PATENT DOCUMENTS

| | | |
|---|---|---|
| 2031533 | 4/1980 | United Kingdom . |
| 2033983 | 5/1980 | United Kingdom . |
| 2047361 | 11/1980 | United Kingdom . |
| 2048401 | 12/1980 | United Kingdom . |
| 2060793 | 5/1981 | United Kingdom . |

OTHER PUBLICATIONS

U.S. Ser. No. 134,986–Kishi et al.
U.S. Ser. No. 136,337–Kishi et al.

Primary Examiner—Leslie A. Braun
Assistant Examiner—Joseph M. Rolnicki
Attorney, Agent, or Firm—Schwartz, Jeffery, Schwaab, Mack, Blumenthal & Koch

[57] ABSTRACT

A shift shock in an automatic transmission during a change of gear positions is reduced by maintaining a hydraulic pressure (line pressure) equal to the magnitude of a desired hydraulic pressure for a predetermined holding time.

7 Claims, 20 Drawing Figures

HYDRAULIC PRESSURE CONTROL SYSTEM FOR AUTOMATIC TRANSMISSION

BACKGROUND OF THE INVENTION

1. Field of the Invention

The present invention relates to a hydraulic control system for an automatic transmission, and more particularly to a hydraulic control system for reducing shift shock in an automatic transmission during a change of gear position.

2. Description of the Prior Art

For preventing shift shock, there is known a system as proposed in U.S. Pat. No. 3,710,630 (Tokko No. Sho 49-9536 or U.S. Pat. No. 4,106,368 (Tokkai No. Sho 53-79158).

According to the system proposed in U.S. Pat. No. 3,710,630 (Tokko No. Sho 49-9536), the hydraulic pressure applied to the hydraulically actuated friction means is reduced to a low level in response to a shift or gear change command signal. The hydraulic pressure stays in the low level for a predetermined time duration. Since the low level and the predetermined time duration are constant, and variation in the engine load before or after the gear change is not taken into account at all. However, there is a drawback in that the friction means may slip excessively for non gear change operation or the decrease in hydraulic pressure may not be enough to insure a shockless gear change.

According to the system proposed by U.S. Pat. No. 4,106,368 (Tokkai No. Sho 53-79158), the output torque at the transmission output shaft is detected by a transducer and is applied to an electronic control unit which can control the gear change by regulating the hydraulic pressure in response to the detected output torque. This known system has a drawback that, under the presence of a torque variation in the engine output, torsional vibration in a driven shaft, or slipping of the wheels, the transducer can not detect the output torque accurately.

SUMMARY OF THE INVENTION

An object of the present invention is to provide a hydraulic pressure control system which is free from the above mentioned drawbacks.

According to the present invention, a hydraulic pressure applied to the hydraulically actuated friction means to be actuated for gear change is reduced to a low target level which is determined in response to the engine load.

According to the present invention, there is an effect in that the hydraulic pressure stays at the low target level for a time duration which is determined in response to the engine load.

According to the present invention, there is still an effect in that the low target level is determined not only on the engine load but also on the vehicle speed.

According to the present invention, there is a further effect in that a time circuit generates a signal having a predetermined time duration during which the hydraulic pressure stays at the target low level upon gear change.

According to the present invention, there is a still further effect in that the time circuit which defines the time duration is set when the hydraulic pressure is substantially equal to the target low level upon gear shift.

According to the present invention, there is a still further effect in that the engine load right before the gear shift is stored in a memory and based on the stored engine load the low target level is determined and the low target level is corrected in response to a difference, between the stored engine load and the engine load after the commencement of the gear change.

According to the present invention, there is a still further effect in that the time circuit varies the time duration in response to the engine load.

BRIEF DESCRIPTION OF THE DRAWINGS

In several figures of the drawings, like reference numerals identify like components, and in those drawings.

DESCRIPTION OF THE PREFERRED EMBODIMENTS

Figure 1A:
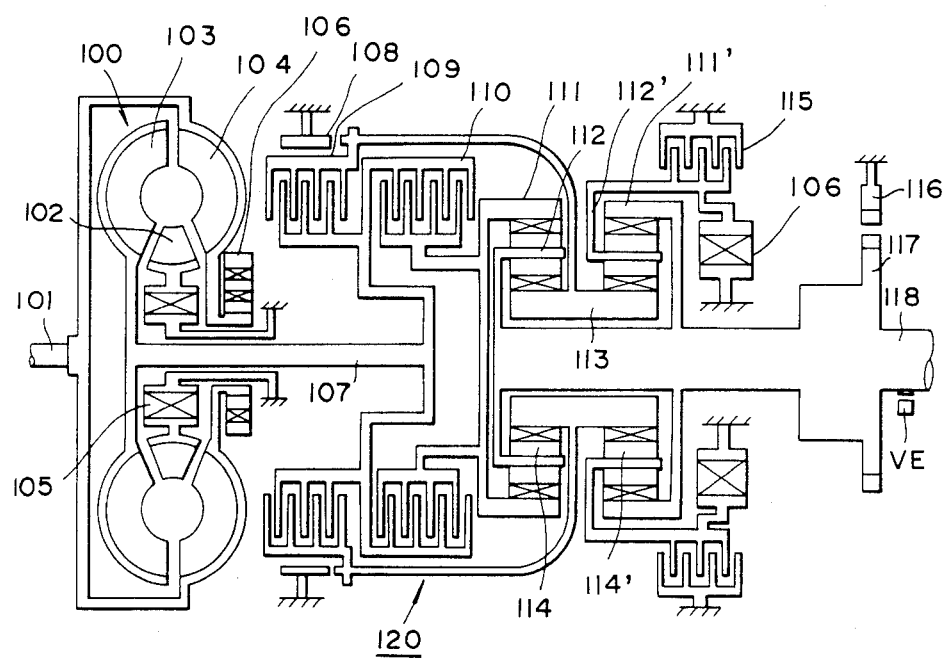
FIG. 1(A) is a schematic sectional view of a power transmission system of an automatic transmission.
Figure 1B:
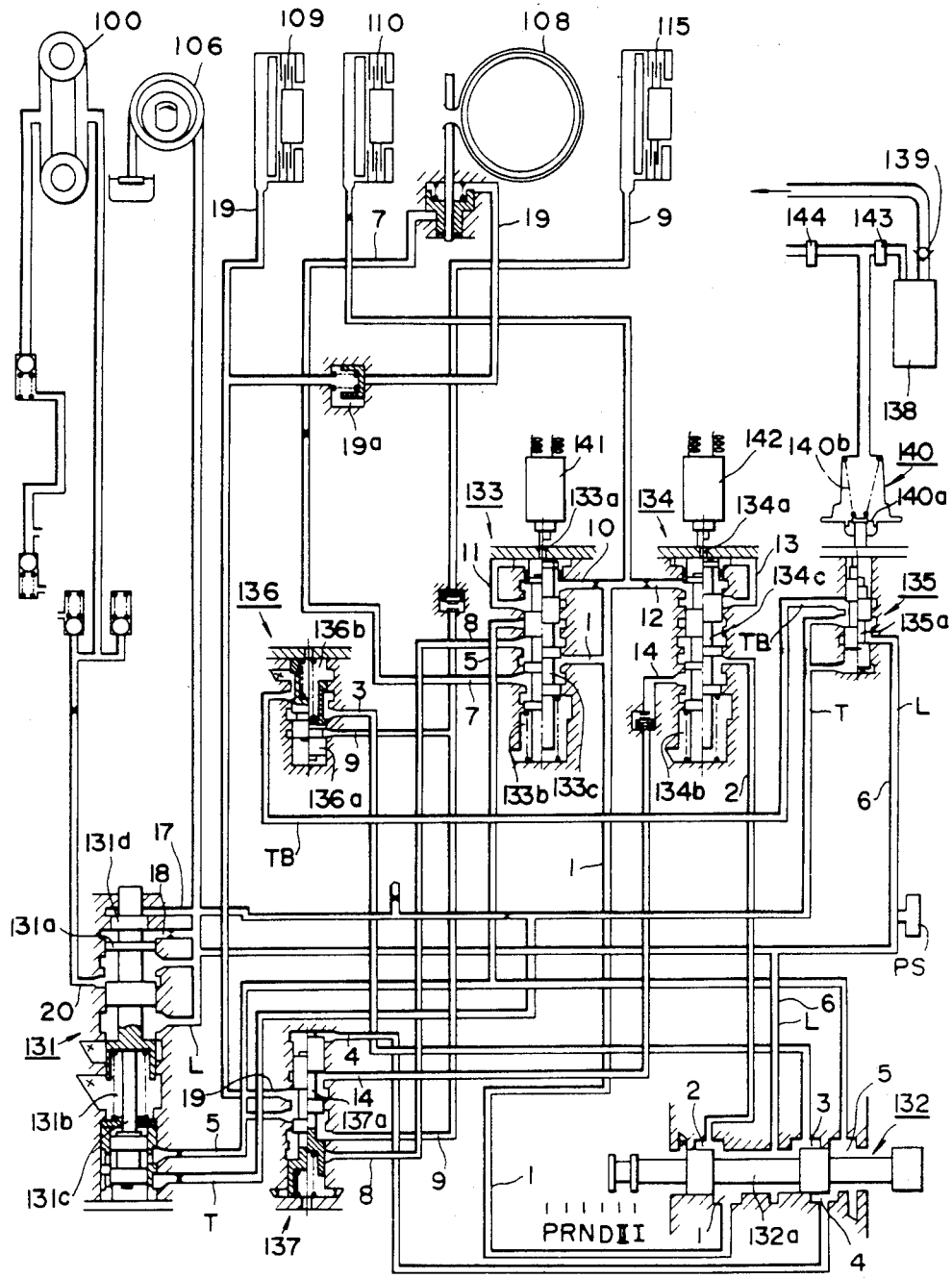
FIG. 1(B) is a circuit diagram showing a hydraulic control circuit of the automatic transmission shown in FIG. 1(A)

Referring to the drawings and particularly to FIGS. 1(A) and 1(B), a power transmission system and a hydraulic control circuit for supplying the hydraulic pressure to the power transmission system.

Power transmission system:

Referring to FIG. 1(A), the power transmission system comprises a torque converter 100 and a change speed gearing mechanism which can provide three forward gear ratios including a first gear ratio (low), a second gear ratio (intermediate) and a third gear ratio (direct drive) and a reverse. The torque converter 100 is of a known construction and comprises a pump impeller 104 connected to an engine crankshaft 101, a turbine runner 103 connected to a turbine shaft 107, and a stator 102 connected to a stationary portion through a one-way clutch 105. The change speed gearing mechanism 120 illustrated herein is well known in the art and after referred to as a simpson gear train. Briefly explaining, it comprises a front carrier 112, a rear carrier 112', a front ring gear 111, a rear ring gear 111', front pinions 114, rear pinions 114' and a common sun gear 113. It also comprises friction elements including a band brake 108 (second brake) which when applied holds the sun gear 113 stationary, a front clutch 109 (high & reverse cluch) which when coupled establishes connection between the turbine shaft and the sun gear 113, a rear clutch 110 (forward clutch) which when coupled establishes connection between the turbine shaft 101 and the front ring gear 111, a low & reverse brake 115 which when applied holds the rear carrier 112' stationary, and a one-way clutch 106 which prevents the rear carrier 112' from rotating in the opposite rotational direction to that of the engine crankshaft 101. The rear ring gear 111' and the front carrier 112 are connected to a transmission output shaft 118. An oil pump 106 functions to supply hydraulic fluid to the torque converter 100, and to hydraulic actuators of the friction elements 108, 109, 110, 115 via a hydraulic control circuit shown in FIG. 1(B).

Designated by the reference numeral 116 is a parking pawl of a hand brake adapted to mesh with a parking gear 117 splined to the transmission output shaft 118.

Hydraulic control circuit:

Referring to FIG. 1(B), the hydraulic control circuit is illustrated which supplys the hydraulic pressure to the friction element to be engaged.

The hydraulic fluid discharged by the pump 106 is fed to a pressure regulator valve 131 which regulates in a known manner the pressure of the hydraulic fluid and generates a hydraulic pressure often referred to as a line pressure L. The fluid from the oil pump 106 acts on a land 131a of a valve spool via a conduit 18, thus pressing down the valve spool against a valve spring 131b, thereby allowing draining of the fluid via a drain port designated by a character x. As a result, the line pressure in the pressure line 6 has such a magnitude as to balance with the spring 131b. A conduit 20 leads from the pressure regulator valve 131 to the torque converter 100 to supply the hydraulic fluid to the torque converter 100.

The line pressure L varies with a throttle pressure T having a magnitude increasing with an increase in the engine load, which may be represented by the depression of an accelerator pedal or the throttle opening degree.

The throttle pressure T acts on the bottom end, viewing in FIG. 1(B), of a plug 131c in such a manner as to assist the spring 131b, decreasing the clearance to the drain port x, thereby increasing the line pressure L.

The line pressure L is increased if a manual range selector valve 132 is positioned to "R" (reverse) range. If the manual range selector valve 132 is in the "R" range the line pressure L is allowed to act via a conduit 5 on the bottom face of the upper land of the end plug 131c in a manner as to assist the spring 131b, thereby increasing the line pressure L generated by the hydraulic pressure regulator 131.

The manual range selector valve 132 has a valve spool 132a mechanically connected with a manual selector lever (not illustrated) and movable to assume any one of the positions viz., "P(parking)", "R(reverse)", "N(neutral)", "D(drive)", "II(second)" and "I(first)" to distribute the line pressure L to various conduits 1, 2, 3, 4 and 5 in the following manner.

conduit 1—1-2 shift valve 133, 2-3 shift valve 134, rear clutch 110,
conduit 2—2-3 shift valve 134,
conduit 3—throttle back-up valve 136,
conduit 4—emergency valve 137,
conduit 5—pressure regulator valve 131, 1-2 shift valve 133, The line pressure L is supplied to those of the various conduits which are designated by o as shown in the following Table 1 as against the various ranges selected.

TABLE 1

| Conduit | Range | | | | | |
|---|---|---|---|---|---|---|
|  | P | R | N | D | II | I |
| 1 |   |   |   | o | o | o |
| 2 |   |   |   | o | o |   |
| 3 | o | o |   |   | o | o |
| 4 | o | o |   |   |   | o |
| 5 |   | o |   |   |   |   |

The throttle pressure T is generated by a throttle valve 135 which receives the line pressure L and regulates it in response to the engine load, and it causes via the hydraulic pressure regulator valve 131 to vary the line pressure L in response to the throttle pressure. A valve spool 135a of the throttle pressure valve 135 is coupled with an actuator 140 of the vacuum actuated diaphragm type. The vacuum acting upon the diaphragm 140a is controlled in response to the engine load such that it increases as the engine load decreases. When the vacuum acting upon the diaphragm 140a is small (when the engine load is heavy), the valve spool 135a is pressed down by a spring 140b within the actuator 140 to take a downward position (the position indicated by the right half in the drawing), thus allowing the line pressure L fed to the throttle valve 135 to act as the throttle pressure T, upon the pressure regulator valve 131, thereby increasing the magnitude of the line pressure L to the maximum level. When the vacuum acting upon the diaphragm 140a is great (when the engine load is light in FIG. 1(B)), the valve spool 135a is lifted against the spring 140b by the diaphragm 140a to take a raised position (the position illustrated in the left half position in FIG. 1(B)), thus decreasing the magnitude of the throttle pressure T acting upon the pressure regulator valve 131, thereby decreasing the magnitude of the line pressure L to a minimum level.

The engine manifold vacuum is stored in a vacuum tank 138 via a check valve 139, and the vacuum within the vacuum tank is transmitted to the actuator 140 to act upon the diaphragm 140a via a vacuum solenoid valve 143 which is opened when energized or rendered ON. Atmosphere is transmitted to the actuator 140 to act upon the diaphragm 140a via an atmosphere solenoid valve 144 which is opened when energized or rendered ON. By controlling these solenoid valves 143 and 144 in response to an engine load signal 206, such as a position of a throttle flap TF (see FIG. 2), the vacuum acting upon the diaphragm 140a is adjusted in response to the engine load signal 206. Thus, the magnitude of the line pressure varies with the variation in the vacuum within the actuator 140 in such a manner that the magnitude of the line pressure is reduced as the vacuum within the actuator 140 increases.

Referring to a throttle back up valve 136, in the event the manual selector valve 132 is manipulated from D range to II range or from D range to I range, and the second gear ratio is to be established within the automatic transmission, the line pressure L passes through a conduit 3 to the throttle back up valve 136 so as to bias a valve spool 136a against a spring 136b to a position illustrated by the right half in FIG. 1(B), thus allowing a portion of the line pressure L in the conduit 3 to escape via a drain port x of the valve 136 thus generating a throttle back up pressure TB which is lower than the line pressure L. The throttle back up pressure TB is fed to the throttle valve 135. When the valve spool 135a of the throttle valve 135 is in the illustrated left half position in FIG. 1(B), the throttle pressure T is increased to a magnitude as high as that of the throttle back up pressure TB and acts upon the bottom land of the end plug 131c, thus causing the pressure regulator valve 131 to increase the line pressure. Since it is when the engine load is small that the valve spool 135 assumes the illustrated left half position in FIG. 1(B), a delay in application of the band brake 108 which otherwise would occur due to lack in the magnitude of the line pressure L is prevented. And the second gear ratio is established by aplication of the band brake 108.

Designated by the reference numeral 137 is an emergency valve which prevents the throttle back up valve 136 from generating the throttle back up pressure TB when first gear ratio is established with the manual selector valve 132 in I range. In the first gear ratio, a valve spool 133c of a 1-2 shift valve 133 assumes the illustrated left hand position. Since in the I range, the conduits 1, 2 and 3 receive the line pressure L (see Table 1), the line pressure in the conduit 1 is admitted to a conduit 8, because the valve spool 133c of the 1-2 shift valve 133 is in the illustrated left half position in FIG. 1(B), and is thus allowed to pass via the conduit 8 to the emergency valve 137. In this event, a spool 137a of the emergency valve 137 is in the illustrated left half position because the line pressure L in the conduit 4 acts upon the top end of the spool 137a. Thus, the line pressure L in the conduit 8 is allowed to pass via the conduit 9 to the low reverse clutch 115 to engage same. The line pressure L in the conduit 9 is fed also to the throttle back up valve 136 to act, via a radial and an axial bore (shown by dotted lines) formed through the valve spool 136a, upon the bottom end of the valve spool 136a to bias it against the spring 136b toward the illustrated left half position in FIG. 1(B). In the illustrated left half position in FIG. 1(B), the throttle back-up pressure TB is allowed to escape via the drain port x of the throttle back up valve 136. Therefore, an excessive increase in line pressure by the throttle L back-up pressure is prevented.

The valve spool 137a of the emergency valve 137 is in the illustrated left half position (in FIG. 1(B)) under the action of the line pressure L fed thereto via the conduit 4 when the manual range valve 132 is in R range. This allows the line pressure L in the conduit 5 fed from the manual range valve 132 to pass via a conduit 19, to the clutch 109 and also to the release side of the band servo 108. An orifice check valve 19a provided in the conduit 19 provides a delay in rising of the hydraulic pressure to the band servo 108.

As is apparent from Table 1, the conduit 1 receives line pressure L when the manual range valve 132 is positioned in D or II or I. When the manual range valve 132 is positioned in P or R or N, the conduit 1 is discharged and receives no pressure.

The conduit 1 has two branch passages 10 and 12 extending to a 1-2 shift valve 133 and a 2-3 shift valve 134. The 1-2 shift valve 133 has a spool 133c which is biased by a spring 133b to assume the illustrated right half position viewing in FIG. 1(B) when a 1-2 shift solenoid 141 is rendered OFF (not energized) to open a drain orifice 133a. In this state, the fluid within a chamber above the top, viewing in FIG. 1(B), is drained and this chamber is allowed to communicate with the conduit 10 via a clearance formed between this top land and the adjacent valve bore defining wall. When it is rendered ON (energized), the solenoid 141 closes the drain orifice 133d. Then, the line pressure L builds up to act on the valve spool 133c to bias same against the spring 133b toward the illustrated left half position in FIG. 1(B). During the transitional period, the clearance formed around the top land of the valve spool 133c is closed and the conduit 11 now communicates the chamber above the top land with the conduit 10. The 2-3 shift valve 134 operates on the same principle as that on which the 1-2 shift valve 133 does.

It includes a valve spool 134c which assumes the illustrated right half position in FIG. 1(B) owing to the action of a spring 134b when a 2-3 shift solenoid 140 is rendered OFF (not energized) to close a drain orifice 134a. When the 1-2 shift solenoid 140 is rendered ON (energized) to close the drain orifice 134a, the valve spool 134c is biased against the spring 134b by the pressure build up via a conduit 13 toward the illustrated left position in FIG. 1(B).

The operation of the hydraulic control system can be readily understood to those skilled in the art only by inspecting FIG. 1(B), Table 1 and Table 2, so that a detailed description thereof has been omitted for ths sake of brevity of description.

TABLE 2

| Range | Shift solenoid 1-2 141 | Shift solenoid 2-3 142 | Clutch Front 109 | Clutch Rear 110 | Low rev. brake 115 | Band servo 108 App. | Band servo 108 Rel. | One way clutch 106 |
|---|---|---|---|---|---|---|---|---|
| P | OFF | OFF | | | | o | | |
| R | OFF | OFF | o | | | o | | o |

TABLE 2-continued

| Range | Shift solenoid 1-2 141 | 2-3 142 | Clutch Front 109 | Rear 110 | Low rev. brake 115 | Band servo 108 App. | Rel. | One way clutch 106 |
|---|---|---|---|---|---|---|---|---|
| N | OFF | OFF | | | | | | |
| D 1st | ON | ON | | o | | | | o |
| 2nd | OFF | ON | | o | | o | | |
| 3rd | OFF | OFF | o | o | | o | o | |
| 2 2nd | OFF | ON | | o | | o | | |
| 3rd | OFF | OFF | o | o | | o | o | |
| 1 1st | ON | OFF | | o | o | | | |
| 2nd | OFF | OFF | | o | | o | | |

In the above Table 2, ON denotes energization, OFF deenergization, and o engagement of the corresponding element. The band servo 108 is constructed such that when the hydraulic pressure is fed to both of the apply (App.) and release (Rel.) sides, it is released because there is a differential area.

Figure 2:
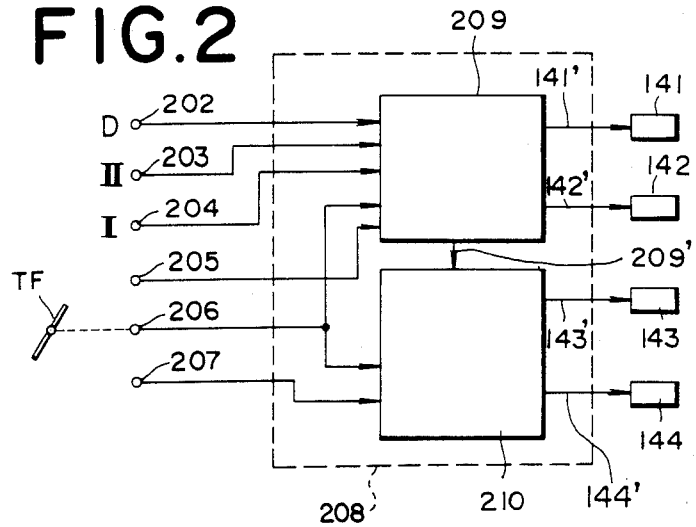
FIG. 2 is a block diagram showing a general environment of the present invention.

General environment of the invention:

Referring to FIG. 2, an electronic control system 208 for controlling the 1-2 shift solenoid 141, 2-3 shift solenoid 142, vacuum solenoid 143 and atmosphere solenoid 144 comprises a circuit 209 to decide a gear ratio or position to be selected and a circuit 210 to control a line pressure.

Since the concrete circuit structure of the electronic control system is unnecessary for the understanding of the present invention, the following description concentrates on its control laws and the specific description has been omitted accordingly. As the circuit structure of the electronic control system, one which has been proposed in U.S. patent appln. Ser. No. 136,337 (Tokkugan No. Sho 54-41345) or U.S. patent appln. Ser. No. 134,986 (Tokkugan No. Sho 54-39351) may be employed.

Figure 3A:
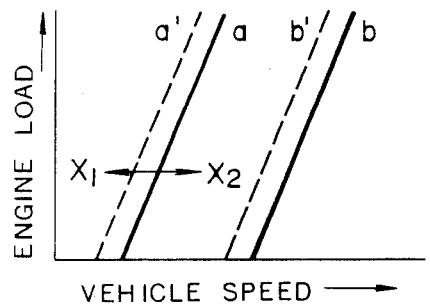
FIG. 3(A) is a shift pattern diagram showing a 1-2 upshift line a, a 2-3 upshift line b, a 2-1 downshift line a' and 3-2 downshift line b' along which an electronic gear shift control system shown in FIG. 2 generates a gear signal representing a gear ratio or position to be established in the automatic transmission when the manual range selector valve is in D range.
Figure 3B:
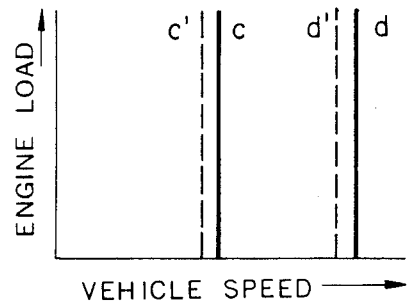
FIG. 3(B) is a shift pattern diagram showing a 1-2 upshift line c, a 2-3 upshift line d, a 2-1 downshift line c' and a 3-2 downshift line d' along which the electronic gear shift control system generates a gear signal representing a gear ratio or position to be established in the automatic transmission when the manual range selection valve is II or I range.

The gear decision circuit 209 selects shift lines shown in FIG. 3(A) when it receives a D range signal 202, and determines a gear ratio to be established using the shift lines shown in FIG. 3(A) and vehicle speed signal 205 and engine load signal 206. When it receives II range signal 203 or I range signal 204, the decision circuit 209 selects gear shift lines shown in FIG. 3(B) and determines a gear ratio to be established using the shift lines shown in FIG. 3(B) and vehicle speed signal 205 and engine load signal 206. The gear decision circuit 209 generates instructions (ON or OFF) 141' and 142' to the 1-2 shift solenoid 141 and 2-3 shift solenoid 142. Instructions to be generated are determined in accordance with the Table 2.

When D range is used, the shift lines shown in FIG. 3(A) are used in such a manner that with the engine load constant, if the vehicle speed increases from $X_1$ to $X_2$, an upshift command from the 1st gear ratio to the second gear ratio is generated upon crossing the gear shift line. The shift line b defines upshift points from the second gear ratio to the third gear ratio. The downshift from the second gear ratio to the first gear ratio and from the third gear ratio to the second gear ratio are determined by the shift lines a' and b', these shift lines are disposed on the relatively low vehicle speed side as is apparent from FIG. 3(A), thus providing hysteris effect upon downshift. Within II range and I range, a gear position to be established is determined using the gear shift lines d, d' and c, c' shown in FIG. 3(B).

Figure 4:
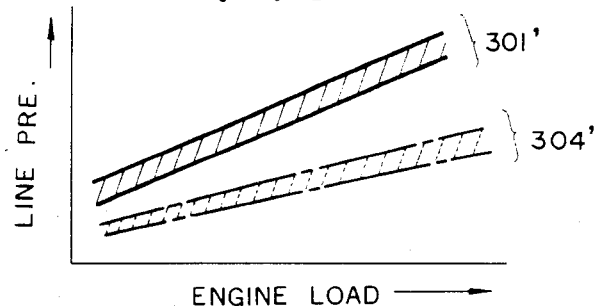
FIG. 4 is a graph showing a line pressure vs., engine load characteristic (shown in solid lines) used for non gear change operation conditions and that (shown in broken lines) used for gear change operation conditions.

The hydraulic pressure control decision circuit 210 is fed with engine load signal 206 and the actually measured line pressure signal 207 representative of the magnitude of the line pressure so as to compare the line pressure value of the actually measured line pressure signal 207 and a line pressure value corresponding to the engine load from a desired line pressure characteristic vs., engine load as shown in FIG. 4, and energizes or deenergizes the vacuum solenoid 143 and atmosphere solenoid 144 with the output signals 143' and 144' so as to actuate the hydraulic pressure adjusting valve 135 in such a manner as to provide the magnitude of line pressure which corresponds to the engine load. In FIG. 4, the shaded area with solid lines and that with broken lines show insensible areas where both of the solenoids are not energized (OFF) so as to prevent consumption of unnecessary electric power.

The range position signals 202 to 204 may be obtained by sensors such as switches which are rendered ON selectively when the manual range lever takes the corresponding position. The vehicle speed signal 205 may be obtained by a sensor VE (see FIG. 1(A)) in the form of a lead switch which performs ON or OFF operation in response to magnet means rotatable with the output shaft of the transmission. The engine load signal 206 may be obtained by a sensor in the form of a potentiometer detecting the throttle opening degree of the engine throttle TF (see FIG. 2) or a sensor in the form of a potentioment detecting the displacement of a diaphragm which is subjected to the intake manifold vacuum. The actually measured line pressure signal 207 may be obtained by a pressure sensor PS (see FIG. 1(B)) including a potentiometer detecting the displacement of a diaphragm directly exposed to the hydraulic pressure or a sensor in the form of a potentiometer detecting the displacement of the diaphragm subjected to the vacuum acting upon the actuator 140.

First embodiment

Figure 5:
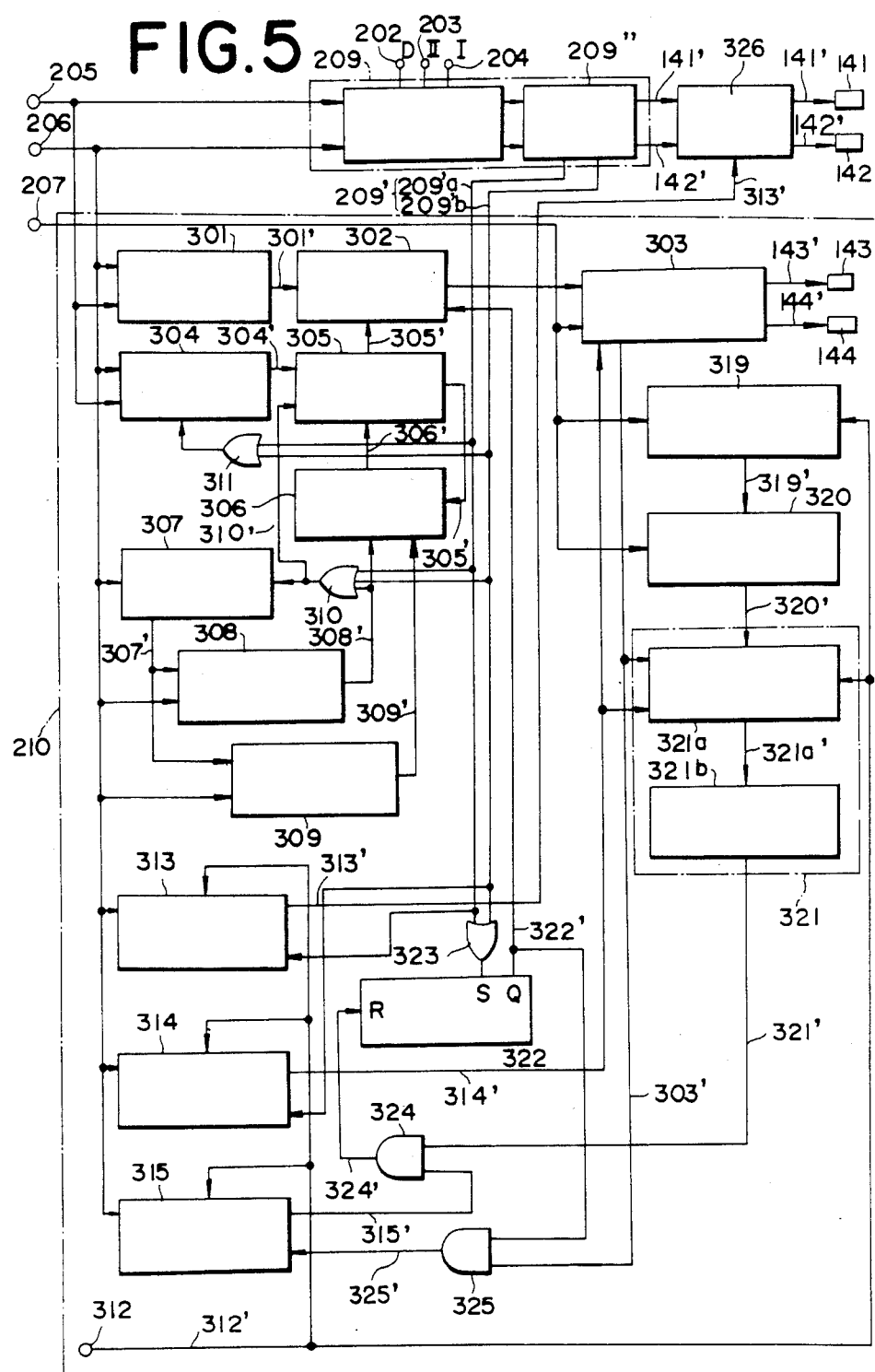
FIG. 5 is a detailed block diagram of FIG. 2 illustrating a first embodiment of a hydraulic pressure control system according to the present invention.

FIG. 5 illustrates a specific structure of the hydraulic pressure control decision circuit 210 shown in FIG. 2.

Referring to FIG. 5, the engine load signal 206 is fed to a target line pressure generating circuit 301 which generates a target line pressure 301' suitable for non gear shifting operation in response to the engine load (see FIG. 4). The target line pressure generating circuit 301 may take the form of a function generator and generates a target line pressure signal 301' for non gear shifting operation representing a line pressure corresponding to the magnitude of the engine load and feeds it to one of input terminals of a solenoid drive decision circuit 303 via a switching circuit 302.

The solenoid drive decision circuit 303 has the other input terminal impressed with the actually measured line pressure signal 207 and compares the both input signals 301' and 207 with each other to render the vacuum solenoid 143 and the atmosphere solenoid 144 ON or OFF so as to reduce a difference between the input signals toward zero. Further, this solenoid drive decision circuit 303 ceases its operation as long as a high (H) level signal 314' is fed from a time circuit 314, thus rendering both of the solenoids 143 and 144 OFF.

Referring to the manner of detecting a shift command, there is provided gear shift generating circuit 209" using a multivibrator which is triggered by a fall ON to OFF of each of the solenoid drive signals 141' and 142' (see Table 2). The circuit 209" generates 1-2 upshift command signal 209a' in response to a change from ON to OFF of the solenoid drive signal 141' generated by the gear decision circuit and a 2-3 upshift command signal 209b' in response to a change from ON to OFF of the instruction 142' generated by the gear decision circuit 209. The gear shift command signal 209a' or 209b' is fed via an OR gate circuit 311 to a low target line pressure generating circuit 304 which generates a low target line pressure signal 304' which is lower than the target line pressure signal 301' for the non gear shifting operation. The target low line pressure generating circuit 304 may take the form of a function generator and is fed with an engine load signal 206. It is triggered by the shift command signal 209'a or 209'b and generates a target low line pressure signal 304' in response to the engine load signal 206 upon generation of the gear shift command signal 209'a or 209'b using a function 304' shown in FIG. 4.

305 designates a memory circuit which is triggered by the shift command signal 209'a or 209'b and stores the target low line pressure signal 304'. The memory circuit stores the value represented by the signal 304' and keeps generating a signal 305' representing the value stored and feeds same to a correction circuit 306. The shift command signal 209'a or 209'b is fed via an OR gate circuit 310 to the memory circuit 305 in the form of an output 310'.

The signal 305' is fed not only to the switching circuit 302 but also to a correction circuit 306. The correction circuit 306 determines a new target low line pressure in response to the signal 305' and a signal 309' (see FIG. 10) generated by a load difference detection circuit 309. The correction circuit 306 keeps generating a signal 306' representing the new target low line pressure and feeding the signal 306' to the memory 305. The memory circuit 305 stores the signal 306' whenever an output signal 308' of a comparator circuit 308 is fed to the memory circuit 305 via the OR gate circuit 310. The output signal 308' is fed also to the correction circuit 306 to cause same to determine a new target line pressure by receiving the signal 309' from the load difference detection circuit 309.

The engine load signal memory circuit 307 stores an engine load signal 206 whenever it is triggered by the output signal 310' of the OR gate circuit 310, and it generates a signal 307' representing the stored value and keeps feeding same to the comparator circuit 308 and the difference detection circuit 309.

The comparator circuit 308 is fed with the engine load signal 206 and the signal 307' representing the stored value from the engine load memory circuit 307, and feeds a signal 308' via the OR gate circuit 310 to the memory circuits 305, 307 and to the correction circuit 306 whenever the comparison result between both of the signals 206 and 307' indicates that the engine load has changed.

The difference detection circuit 309 is fed with the signal 307' and the engine load signal 206 and generates a signal 309' representing the amount of a difference between the signals 307' and 206 and feeds it to the correction circuit 306.

Designated by 312 is a clock pulse generator which keeps generating a clock pulse 312' at regular predetermined intervals. The clock pulse signal 312' is fed to time circuits 313, 314 and 315 which are in the form of an integrator circuit and utilize the clock pulse signal for determining the elapsed time.

Figure 6:
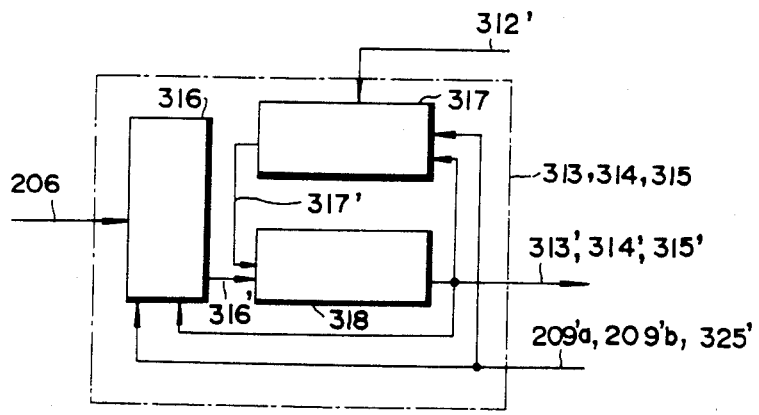
FIG. 6 is a block diagram showing a structure of each of the time circuits used in the system shown in FIG. 5.
Figure 14:
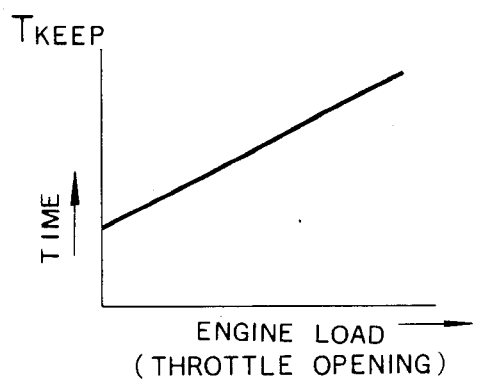
FIG. 14 is a graph showing the relationship between $T_{KEEP}$ and the engine load in terms of the throttle opening degree.
Figure 15:
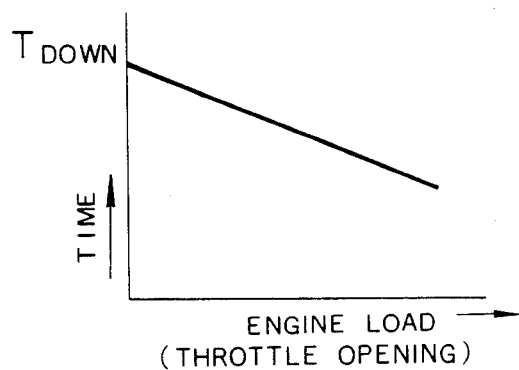
FIG. 15 is a graph showing the relationship between $T_{DOWN}$ and the engine load in terms of the throttle opening degree.
Figure 16:
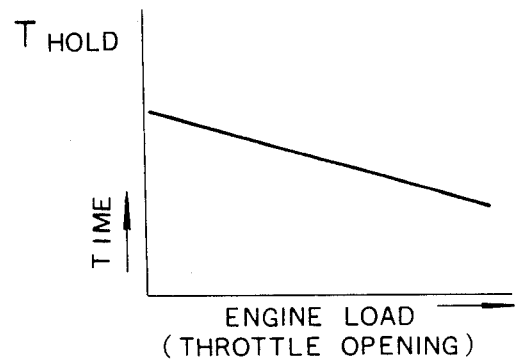
FIG. 16 is a graph showing the relationship between $T_{HOLD}$ and the engine load in terms of the throttle opening degree.

The time circuits 313, 314 and 315 have a common circuit structure as shown in FIG. 6 and are fed with the engine load signal 206 and can generate signals 313', 314' and 315' having predetermined time durations which are variable with the engine load as shown in FIGS. 14, 15 and 16. Explaining the common structure referring to FIG. 6, designated by 316 is a time setting circuit which generates a signal 316' for a time which is variable with the engine load signal 206 whenever it receives a 1-2 upshift signal 209a' or a 2-3 upshift signal 209b' or an output signal 325' of an AND gate circuit 325. Designated by 317 is an integrator circuit which starts to count the clock pulse signal 312' whenever it receives signal 209a' or 209b' or 325' and generates a signal 317' which represents the lapse time and feeds it to a comparator circuit 318.

The comparator circuit 318 receives the signal 316' indicative of the set time and the signal 317' from the integrator circuit 317 representing the lapsed time and compares these signals. It keeps generating a signal 313' or 314' or 315' as long as the set time indicated by the signal 316' is longer than the lapsed time indicated by the signal 317' and stops the generation of the signal 313' or 314' or 315' when the lapsed time exceeds the set time. The integrator circuit 317 is fed also with the signal 313' or 314' or 315' from the comparator circuit 318 and its integrated value is cleared upon the fall in the signal 313' or 314' or 315'. The time setting circuit ceases the generation of the signal 316' when it receives the signal 313' or 314' or 315' from the comparator circuit 318.

The solenoid drive decision circuit 303 is fed not only with the signal 301' from the target line pressure generating circuit 301 during non gear shifting operation or the signal 305' from the target low line pressure signal memory circuit 305 during gear shifting operation through the switching circuit, but also with the actually measured line pressure signal 207, and drives the vacuum solenoid 143 and the atmosphere solenoid 144 selectively so as to adjust the line pressure to maintain the actual line pressure equal with the line pressure value represented by the signal 301' or 305'.

The solenoid drive decision circuit 303 is fed also with the signal 314' from the time circuit 314 which is actuated during 2-3 upshifting and it stops driving the solenoids 143 and 144 irrespective of the input signals for a time duration $T_{DOWN}$ after the 2-3 upshift signal 209b' is fed so as to suspend the line pressure control, and it generates a signal 303' when the actually measured line pressure signal 207 agrees with the target low line pressure signal 305'.

Designated by 319 is a line pressure memory circuit which is fed with the actually measured line pressure signal 207 and clock pulse signal 312'. It stores a new value of the actually measured line pressure signal 207 whenever it receives the clock pulse signal 312' and keeps generating a signal 319' indicating the stored value and feeding it to a line pressure comparator circuit 320. The comparator circuit 320 is fed with the actually measured line pressure signal 207 in addition to the signal 319' and generates a signal 320' and feeds it to a count-up counter 321a of a time circuit 321 when both of the signals indicate generally the same values.

The time circuit 321 comprises the count-up counter 321a and a comparator circuit 321b. The count-up counter 321a is set by the fall in the signal 314' from the time circuit 314 and continues to count the clock pulse signal 312' as long as it receives the signal 320', and it is cleared by the rise in the signal 303' from the solenoid drive decision circuit 303. Accordingly, the count-up counter 321a detects, under the condition of gear shifting and when the solenoid drive decision circuit 303 keeps driving the solenoids 143 and 144 in response to the target low line pressure signal 305', the time during which the actually measured line pressure signal 207 stays generally unchanged. The count-up value within the count-up counter 321a is fed to a comparator circuit 321b as an output signal 321a', and the comparator compares it with a predetermined value and it stops the generation of its output signal 321' when the count-up value exceeds the predetermined value.

Designated by 322 is a decision circuit which instructs the switching action of the switching circuit 302 and it is in the form of a flip-flop and feeds an instruction signal 322' to the switching circuit 302.

This decision circuit 322 has a set terminal S fed with the 1-2 upshift command signal 209'a or 2-3 upshift command signal 209'b via an OR gate circuit 323 and generates the instruction signal 322' at the output terminal Q and feeds it to the switching circuit 302 whenever it receives one of the command signals 209'a and 209'b. The switching circuit 302 feeds the target low line pressure signal 305' generated by the target low line pressure signal memory circuit 305 to the solenoid drive decision circuit 303 when it receives the signal 322'.

A reset terminal R of this decision circuit 322 is connected via an AND gate circuit 324 to the time circuits 321 and 315. The decision circuit 322 stops generation of the instruction signal 322' from the output terminal Q when at least one of output signals 321' and 315' of the time circuits 321 and 315 falls. When the generation of the instruction signal 322' ceases, the switching circuit 302 switches its condition and admits the signal 301' from the target line pressure generating circuit for non gear shifting operation 302 to the solenoid drive decision circuit 303, again. The time circuit 315 is connected via an AND gate circuit 325 to the solenoid drive decision circuit 303 and to the Q terminal of the decision circuit 322. It is triggered when both signals 303' and 322' of the solenoid drive decision circuit 303 and the decision circuit 322 are fed concurrently, viz., the line pressure has decreased to the target low line pressure during gear shift operation, and keeps generating a signal 315 for a time duration $T_{keep}$ to the AND gate circuit 324, see FIG. 14.

The time circuit 313 is triggered when it receives the 1-2 upshift signal 209a' and keeps generating a signal 313' for a time duration $T_{HOLD}$ to the hold circuit 326 (see FIG. 16) and ceases the generation of the signal when the time duration $T_{HOLD}$ has elapsed.

The hold circuit 326 holds that state of the signals 141' and 142' which are fed to the shift solenoids 141 and 142 whenever it receives the signal 313' as long as it receives it, viz., for the time duration $T_{HOLD}$. Upon the elapse of the time $T_{HOLD}$, it allows the admission of the signals 141' and 142' generated by the decision circuit 209'' to the shift solenoids 141 and 142.

Operation of FIG. 5 embodiment

The embodiment described above in connection with FIGS. 1 through 6 operates as follows:

The process of how a shift shock takes place in the automatic transmission during a change of gear positions is explained in connection with FIGS. 7(A) and 7(B). The change in the output torque T is transmitted to the vehicle occupant as a shock, thus providing a discomfort to the vehicle occupant. The shift shock takes place in both cases of upshift and downshift. Various measures can be taken against the shock occurring during downshift because the downshift in most cases takes place during deceleration, it is, however, difficult to take an appropriate measure against the shift shock occurring during upshift because the magnitude of the shock is large when occurring during acceleration when the output torque T is large and the shifting operation has to be completed within a time duration.

Since the present invention is particularly effective in reducing the shift shock during upshift, the following description concentrates on the shift shock during 1-2 upshift and 2-3 upshift.

Figure 7A:
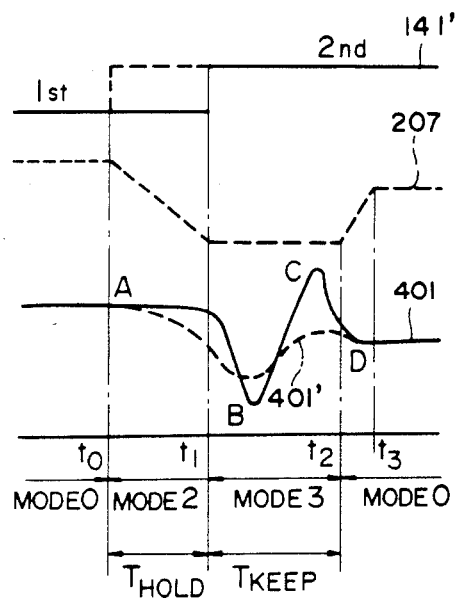
FIG. 7(A) is a timing diagram illustrating a 1-2 upshift operation.
Figure 7B:
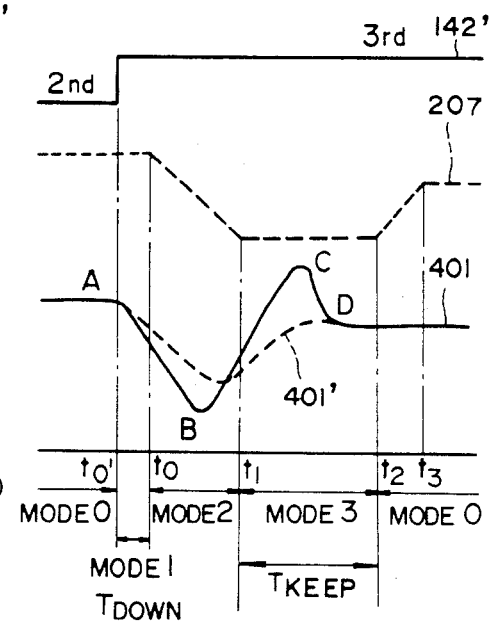
FIG. 7(B) is a timing diagram illustrating a 2-3 upshift operation.

Referring to FIGS. 7(A) and (B), the solid line curve 401 shows the shape of a torque wave of the output torque of the output shaft 118, a step like solid line 141' shows a timing when the 1-2 shift solenoid 141 is switched from ON (1st) to OFF (2nd) to initiate upshift, a step like solid line 142' shows a timing when the 2-3 shift solenoid 142 is switched from ON to OFF upon 2-3 upshift, and a broken line curve 207 (see FIG. 7(B) as well as FIG. 7(A)) show variation in line pressure. Upon 1-2 upshift, at the moment when the 1-2 shift solenoid 141 is switched to ON, the hydraulic pressure is fed through a conduit 7 (FIG. 1(B)) to the band servo 108, initiating the application of the band servo 108. In first gear, in the D range, the one-way clutch 106 bears a reaction which is induced to the rear carrier 112' from the input shaft 107 via the rear clutch 110, thus allowing the drive power to be transmitted to the output shaft 118 (output torque). Thus, at the moment when the band servo 108 is put into action, the drive power begins to be transmitted through the front ring gear 111 and front carrier 112 to the output shaft 118. This state, viz., the one-way clutch 106 is still in action and the band servo 108 is fully applied, is shown by the solid line curve 401 in FIG. 7(A) from the point A to point B.

Subsequently, when the ratio of the transmission of power through the power transmission path including the ring gear 111 and the front carrier 112 increases and the one-way clutch begins to free wheel as a result that the band servo 108 has been fully engaged, the upshift to the second gear ratio is completed. This state is illustrated by the solid line curve 401 from the point B to point D (see FIG. 7(A)). 1

During this process, the inertia of the revolution of the engine, which has been operated at high speed during the first gear ratio, causes the occurrence of an impact (peak C) as a result of deceleration which occurs at the moment when an upshift to the second gear ratio having a low reduction ratio is about to be completed, thus creating the peak C in the transmission torque T. This peak C is a main cause of the shift shock and it is results from the application of the band servo 108, viz., by the rapid application thereof. A drop in the transmission torque T at the point B also causes a shock which becomes large when the application speed of the band servo 108 is too slow.

Thus, it will be understood that, in order to reduce the shift shock, the line pressure has to be decreased by some degree during a period from the point A to the point D as shown by the broken line curve 207.

Referring to FIG. 7(B), the transitional period upon 2-3 upshift is explained. As is apparent from Table 2, to 2-3 shift solenoid 142 is switched from ON to OFF and this causes the hydraulic pressure to be fed through the conduit 19 to the front clutch 109 and the release side of the band servo 108. Owing to the effect of the orifice of the check valve 19a, the front clutch 109 is put into action prior to the release action of the band servo 108, causing the simultaneous engagement of the front clutch 109 and the band servo 108, resulting in a spontaneous braking of the sun gear 113. This state is shown by the solid line curve 401 from the point A to point B. Subsequently, as the front clutch 109 is engaged firmly and the band servo 108 is released, the change speed gearing mechanism 120 begins to rotate bodily because the rear clutch 110 is engaged, thus establishing the third gear ratio. This state is shown by the solid line curve from the point B to the point D, wherein the inertia of the engine causes the occurrence of a peak C in the output torque at the moment when a shift has been made to the third gear ratio with a small reduction ratio. Since it increases as the engagement of the front clutch takes place abruptly, the magnitude of the peak C may be decreased by decreasing the line pressure, but the amount of decrease in the line pressure is limited because it must be determined properly so as not to cause an excessive delay in release timing of the band servo 108. The amount of decrease in the line pressure during 1-2 upshift and during 2-3 upshift must not be too large and must be determined in consideration of the torque on the input shaft 107, viz., the engine load, so as to prevent excessive slip in the band servo 108 and front clutch 109.

As will be understood from FIGS. 7(A) and 7(B), a time duration which starts at the moment $t_0$ when the 1-2 shift solenoid 141 is rendered OFF (see Table 2) and ends with the peak C during 1-2 upshift (see FIG. 7(B)) is shorter than the corresponding time duration which begins with $t_0'$ and ends with the peak C during 2-3 upshift (see FIG. 7(B)). Thus, peak C will occur at a relatively earler timing during 1-2 upshift than during 2-3 upshift. Thus, since the line pressure must have been dropped when the peak C occurs, the switching of 1-2 shift solenoid 141 during 1-2 upshift must be delayed from the moment $t_0$ to the point illustrated by the solid line 141' in FIG. 7(A).

The operation of the preferred embodiment shown in FIG. 5 will follow making reference to FIGS. 7(A) and 7(B).

Firstly, the operation of the gear selection decision circuit 209 and hydraulic pressure control circuit 210 during 1-2 upshift is described in connection with FIG. 7(A).

Referring to FIG. 7(A), at a moment prior to the moment $t_0$, since the instruction signal 322' is not generated and thus is not fed to the switching circuit 302, the switching circuit 302 admits the target line pressure signal 301' for non gear shifting to the solenoid drive decision circuit 303.

The target line pressure generating circuit 301 generates the target line pressure signal 301' for non gear shift operation in response to the engine load signal 206 (see FIG. 4), which represents a line pressure that is high enough for preventing the slip in each of the fricton elements, for example, the rear clutch 110, as against the magnitude of the output torque. The solenoid drive decision circuit 303 drives both of the solenoids 143 and 144 upon reception of line pressure signal 207 and the signal 301' in a manner as described so as to control the line pressure to the value within the region illustrated by shadowed area drawn by the slanted solid lines in FIG. 4.

At the moment $t_0$, the gear shift signal generating circuit 209" generates a 1-2 upshift command signal 209a' and feeds it to the decision circuit 322, causing it to generate a signal 322' and feed it to the switching circuit 302. This causes the switching circuit 320 to generate the target low line pressure signal 305' which has been stored in the target low line pressure signal memory circuit 305 to the solenoid drive decision circuit 303.

Hereinafter, the target low line pressure signal 305' stored in the target low line pressure signal memory circuit 305 is specifically explained.

Figure 8:
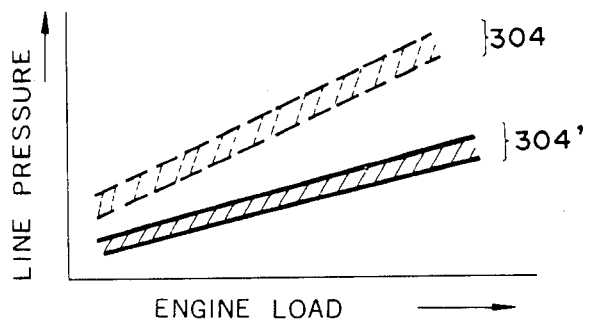
FIG. 8 is a graph showing a line pressure vs., engine load characteristic (shown in broken lines) used for non gear change operation conditions and that (shown in solid lines) used for gear change operation conditions.

The target low line pressure signal generating circuit 304 receives the engine load signal 206 and generates the target low line pressure signal 304' depending upon the magnitude of the engine load signal 206 along the characteristic shown by the solid line in FIG. 8 (see dashed lines in FIG. 4, too). This line pressure signal 304' corresponds to a line pressure lower than the target line pressure signal 301' (see FIG. 4), and the solenoid drive decision circuit 303 compares this signal 304' with the line pressure signal 207 and drives the solenoids 143 and 144 in such a manner as to control line pressure to a value within a range illustrated by slanted lines (solid lines) in FIG. 8 (in FIG. 8, the slanted broken lines are illustrated for comparison purpose).

Although the target low line pressure signal 305' generated by the target low line pressure signal memory circuit 305 at the moment when the 1-2 upshift signal 209a' is generated, at the moment $t_0$, represents the engine load signal 206 occurring at the moment $t_0$, the present embodiment provides an arrangement wherein the stored value within the memory circuit 305 can be corrected if the engine load signal 206 varies after the moment $t_0$.

Figure 9:
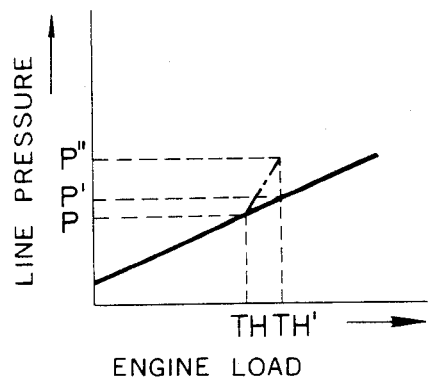
FIG. 9 is a graph showing the line pressure vs., engine load characteristic used to correct the target low line pressure.
Figure 10:
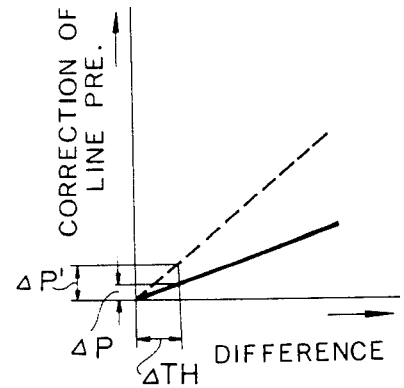
FIG. 10 is a graph showing the correction amount of line pressure vs., the amount of a difference in the engine load.

This is explained along with FIG. 9 and FIG. 10. For example, if after the moment $t_0$ the engine load signal 206 changes from the value TH to a new value TH' (see FIG. 9), the comparator circuit 308 detects a difference between the stored value TH within the engine load signal memory circuit 307 and the value TH' of the engine load signal 206. Then, the difference detection circuit 309 detects this difference as $\Delta$TH (TH'−TH), see FIGS. 9 and 10, and feeds a signal 309' (see FIG. 5) representing this difference $\Delta$TH to the correction circuit 306.

When it receives the signal 308' from the comparator circuit 308, the correction circuit 306 determines by calculation $\Delta$P corresponding to the engine load difference $\Delta$TH (see FIG. 10) and a new target low line pressure P'=P+$\Delta$P, and feeds a signal 306' representing the value P' to the target low line pressure memory circuit 305. This signal 306' is fed via the switching circuit 302 to the solenoid drive decision circuit 303 whereby the line pressure is adjusted to the new corrected target low line pressure P'. This operation is repeated whenever the comparator circuit 308 feeds the signal 308' to instruct the engine load signal memory circuit 307 to store a new value.

In the present embodiment the correction is carried out using the same line pressure vs. engine load relationship (shown by the solid lines in FIGS. 9 and 10) as used for determining the target low line pressure, but, if a relatively high line pressure is desired for the same increase in the engine load, a different line pressure vs. engine load relationship as shown by one dot chain line in FIG. 9 or by broken line in FIG. 10 may be used.

The target low line pressure 305' thus corrected is fed via the switching circuit 302 to the solenoid drive decision circuit 303, thus reducing the line pressure during a time from the moment $t_0$ to $t_1$ (see FIG. 7(A)). When the value of the actually measured line pressure signal 207 agrees with the target low line pressure signal 305' at the moment $t_1$, the solenoid drive decision circuit 303 generates a signal 303'. This signal 303' is fed to one of the input terminals of the AND gate circuit 323. Since the other input terminal of the AND gate circuit 323 receives signal 322' indicative that the gear shift command signal 209'a or 209'b is being generated, the AND gate circuit 325 generates and feeds output signal 325' to the time circuit 315. The time circuit 315 is triggered by the signal 325' and starts to generate signal 315' at the moment $t_1$ and keeps on generating it for the time duration $T_{KEEP}$ from the moment $t_1$ to $t_2$ (see FIG. 7(A)). The signal 315' is fed to one of input terminals of AND gate circuit 324.

Since, normally, the other input terminal of this AND gate circuit 324 receives signal 321' from the time circuit 321, the decision circuit 322 is not reset for the time $T_{KEEP}$. Thus, the decision circuit 322 keeps generating the signal 322', allowing the switching circuit 302 to select and feed the target low line pressure signal 305' to the solenoid drive decision circuit 303.

If the engine load signal 206 is unchanged, the actually measured line pressure signal 207 stays constant for the time period $T_{KEEP}$ as shown by the broken line curve 207 in FIG. 7(A). Upon the elapse of the time $T_{KEEP}$, the generation of the signal 315' ceases to cause a fall in the output of the AND gate circuit 324, thus resetting the decision circuit 322, stopping the generation of the signal 322' fed to the switching circuit 302. Thus, at the moment $t_2$, the switching circuit 302 begins to select and feed non gear shift target line pressure signal 301' to the solenoid drive decision circuit 303. This causes the line pressure to increase to the level represented by the target line pressure signal 301'. At the moment $t_3$, the line pressure reaches this level. If the 1-2 shift solenoid 141 changes its state from ON to OFF at the moment $t_0$ when 1-2 upshift command signal 209'a begins to be generated and the line pressure begins to be reduced, a peak C in the output torque may occur before the line pressure is reduced sufficiently. To prevent this event, the time hold circuit 313 is provided which is triggered by 1-2 shift command signal 209'a and generates a signal 313' having a time duration $T_{HOLD}$ which is fed to the hold circuit 326.

Upon generation of 1-2 upshift command signal, a change (from ON to OFF) in the 1-2 shift solenoid 141' generated by the gear shift signal generator circuit 209" takes place. Since the hold circuit 326 receives the signal 313' for the time $T_{HOLD}$ beginning with $t_0$ (see FIG. 7(A)), the change in the 1-2 shift solenoid drive signal 141' is held and thus the transmission of this change to the 1-2 shift solenoid 141 is delayed for the time $T_{HOLD}$. Thus, the actual 1-2 shift takes place upon the elapse of $T_{HOLD}$, thus delaying the application of the band servo 108 to a moment after the line pressure has been reduced sufficiently. As a result, since the application of the band servo 108 is effected as the line pressure is being reduced, the torque output varies as shown by the broken line curve 401' in FIG. 7(A).

Referring to FIG. 7(B), the line pressure control during 2-3 upshift is explained. When, at the moment $t'_0$, a 2-3 shift solenoid drive signal changes its state from ON to OFF (see Table 2), the gear shift signal generating circuit 209" generates and feeds a 2-3 upshift command signal 209'b to the time circuit 314 and to the set terminal S of the decision circuit 322 via OR gate circuit 323. When triggered by the 2-3 upshift command signal 209'b, the time circuit 314 generates a signal 314' having a time duration $T_{DOWN}$ and feeds it to the solenoid drive decision circuit 303. When set by the 2-3 upshift command signal 209'b, the decision circuit 322 generates and feeds signal 322' to the switching circuit 302.

Upon reception of the signal 314', the solenoid drive decision circuit 303 ceases the drive of the vacuum solenoid 143 and the atmosphere solenoid 144 and holds its state for the time $T_{DOWN}$ determined by the time circuit 314. When the time circuit 314 ceases the generation of the signal 314' at the moment $t_0$ (see FIG. 7(B)), the solenoid drive decision circuit 303 begins to reduce the line pressure toward the target low line pressure. At the moment $t_1$, the solenoid drive decision circuit 303 generates signal 303' (see FIG. 5) indicating that the actually measured line pressure signal 207 has agreed with the target low line pressure signal 305'.

If, between the moment $t_0$ and the moment $t_1$, the engine load signal 206 changes, the target low line pressure signal 305' is corrected whenever the engine load signal changes in the same manner as in the correction during 1-2 upshift. When, at the moment $t_1$, the solenoid drive decision circuit 303 generates the signal 303', the time circuit 315 generates a signal 315' having a time duration $T_{KEEP}$. Upon the elapse of the time $T_{KEEP}$, the signal 315' falls to reset the decision circuit 322, causing the switching circuit 302 to feed the non gear shift target line pressure signal 301' to the solenoid drive decision circuit 303 again. If the engine load signal 206 does not change during the time duration $T_{KEEP}$, the line pressure stays constant as shown by the broken line curve 401' in FIG. 7(B).

By reducing the line pressure in this manner, the variation in the output torque is suppressed as shown by the broken line curve 401' in FIG. 7(B), thus reducing the magnitude of the shift shock.

Since, during the time $T_{DOWN}$ (see FIG. 7(B)), the solenoids 143 and 144 are kept OFF, line pressure is held sufficiently high enough to insure the releasing action of the band brake 108 without any delay, thus preventing the delay in the releasing action.

When the vehicle is travelling at a high altitude region, since the density of the atmosphere is low, a sufficiently high vacuum is not created within the engine induction manifold, thus failing to store a sufficiently high vacuum within the vacuum tank 138. In such an event, even if the vacuum solenoid 143 is kept open (ON), the line pressure does not decrease to the level of the target low line pressure signal 305' and thus the signal 303' will not be generated. As a result, the operation between $t_0$ and $t_1$ as shown in FIGS. 7(A) and 7(B) continues, preventing the control from proceeding further. If such a state with low line pressure level continues, the clutches 109 and 110 and the band servo 108 will be seriously damaged. A similar inconvenience is caused by damage in the diaphragm 140a of the actuator 140 or the insufficient sealing in the conduit interconnecting the actuator and the solenoids 143, 144 or vacuum tank 138 (see FIG. 5). These inconveniences are prevented by resetting the decision circuit 322 even during the gear shifting operation so as to cause the switching circuit 302 to generate non gear shift target line pressure signal 301' to the solenoid drive decision circuit 303.

This can be effected in the embodiment of the circuit shown in FIG. 5 by stopping the generation of the signal 321' so as to reset the decision circuit 322 via the AND gate circuit 324. During the line pressure control upon 2-3 upshift, the counter 321a is initiated upon the fall in the output signal 314' of the time circuit 314. This indicates that the line pressure control to reduce the line pressure has taken place. The counter 321a counts the clock pulse signal 312' and when the counted value exceeds a certain value, the comparator circuit 321b stops the generation of the output signal 321'.

During normal operation, the signal 303' from the solenoid drive decision circuit 303 which is generated when the actually measured line pressure signal 207 agrees with the target low line pressure 305' resets the counter 321a to clear same.

Second embodiment

Figure 11:
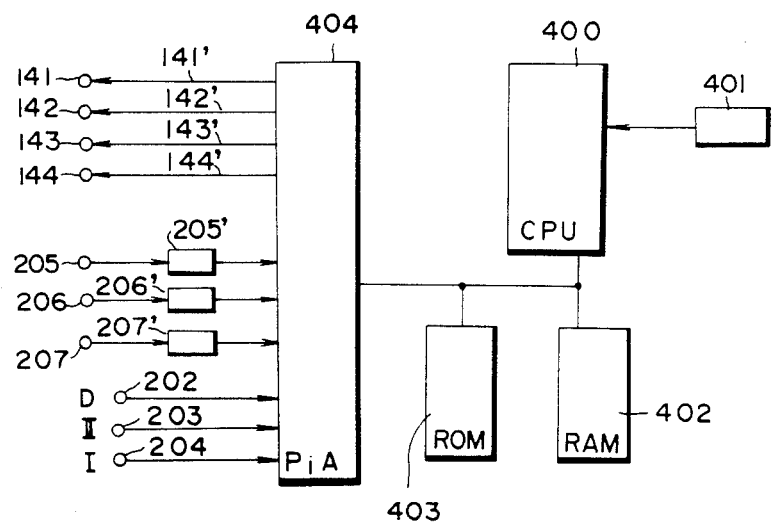
FIG. 11 is a block diagram illustrating a second embodiment using a microcomputer of a hydraulic control system according to the present invention.

FIG. 11 is a general structure of the second embodiment of the control system using a microcomputer, wherein designated by the reference numeral 400 is a central processor unit (hereinafter called as CPU) which operates based on the control program and control data stored in a read only memory 403 (abbreviated hereinafter as ROM). The ROM 43 stores control programs for gear ratio selection decision and for the line pressure control and control data for the fixed values used for them. The CPU 400, on the other hand, has the vehicle speed signal 205, engine load signal 206 and line pressure signal 207 to be converted by the corresponding converters 205', 206' and 207' (for example A/D converter), respectively, into binary coded values and has a random access memory 402 (abbreviated as RAM) to store the binary coded values via an input output controller (abbreviated hereinafter as PiA). The CPU 400 operates based on the stored data and the stored program within the RAM 402 and ROM 403 so as to make decisions as to gear selection and as to control of the line pressure, and generates through the PiA 404 a 1-2 shift solenoid drive signal 141', a 2-3 shift solenoid drive signal 142', a vacuum solenoid drive signal 143' and an atmosphere solenoid drive signal 144'.

Figure 12:
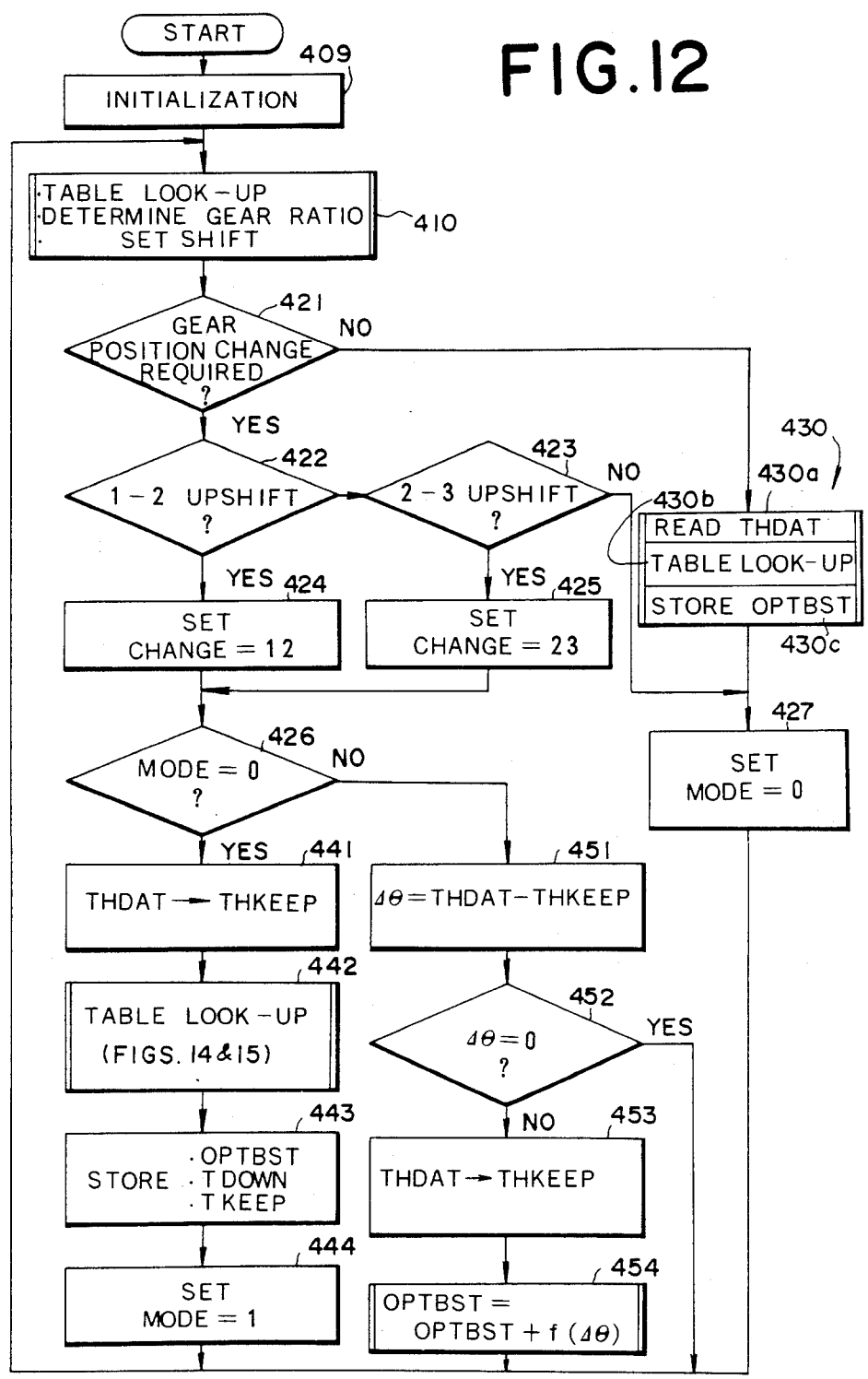
FIG. 12 is a flow diagram illustrating the main routine employed in the second embodiment shown in FIG. 11.

The mode of operation of the control system as mentioned above using the microcomputer is explained along with flow charts of control programs shown in FIGS. 12 and 13.

FIG. 12 is a flow chart of a program 400P showing a main routine for effecting the gear selection and for setting the initial values used for the line pressure control.

FIG. 13 is a flow chart of a program 500 showing an intrrupt routine used in cooperation with the main program 400P for affecting line pressure control. Program 500 operates in response to an interrupt signal which is generated at regular, predetermined intervals by a timer 401. Subsequent to execution of step 502, program control is returned to the main program 400P. Program 400P is not executed while program 500 is operating, and program 500 is repeatedly executed in response to each interrupt clock signal.

The following table (Table 3) sets forth the basic meaning of characteristic address names used in connection with the flowcharts of FIGS. 12 and 13.

TABLE 3

| Address Name | Content |
|---|---|
| SHiFT | OM/OFF command signal for solenoid 141 and 142. |
| CHANGE | gear shift state indications, e.g., 12 identifies 1 to 2 upshift, 23 identifies 2 to 3 upshift. |
| MODE | assumes values 0, 1, 2 and 3 indicating the like pressure state as shown in FIGS. 7A and 7B. |
| THKEEP | stores value of THDAT at start of upshift gear operation |
| THDAT | convert value of throttle opening which is indicative of engine load |

TABLE 3-continued

| Address Name | Content |
|---|---|
| TDOWN | time for storing time for maintaining line pressure level at existing level of the initiation of 2 to 3 upshift. |
| OPTBST | low line pressure target value |
| TKEEP | time for storing time for maintaining line pressure at target value OPTBST |
| $\Delta\theta$ | variation of engine load = THDAT-THKEEP |
| $P_B$ | measured line pressure value as measured by actuator 140 |
| BSTOLD | value stored in $P_B$ during preceding execution of interrupt program |
| FAiLT | time for counting time second during which $P_b$ = BSTOLD |
| Tons | maximum failsafe time value for FAILT. |
| OUTBFR 1 | output buffer for storing value of SHIFT fed to CPU I/O unit. |
| OUTBFR 2 | output buffer for storing birary code controlling solenoids 143 and 144. |

Hereinafter, the program 400P is explained along with the flowchart shown in FIG. 12.

In step 409 various parameters are initialized as, for example, parameters BSTOLD and FAiLT which are set equal to zero.

In step 410, a gear ratio is determined by referring to a gear shift table stored in the ROM 403. The table is utilized to store digital values corresponding to the data shown in FIGS. 3(A) and 3(B). The computer utilizes the table to preform a table lock-up operation to determine the proper gear as a function of vehicle speed value and throttle opening degree value. In step 410, the program also determines the ON/OFF combination of the shift solenoids 141, 142 corresponding to the selected gear ratio. The ON/OFF binary code is stored in the address SHiFT in the RAM 402. The bottom bit ($2^0$) of the address SHiFT stores ON or OFF indication of the 2-3 shift solenoid 142, and $2^1$ bit thereof stores ON or OFF indication of the 1-2 shift solenoid 141.

In the subsequent step 421, a decision is made whether or not the content selected by the address SHiFT in the preceding step 410 is different from the present, actual vehicle gear position. The actual gear position may be determined from sensors or a simple timer may be utilized to count a predetermined time interval, after which the gear change will be assumed to be completed. Since a 1 to 2 upshift takes about 100-300 ms and a 2 to 3 upshift takes about 300-800 ms, the counter may be set for about 1 second. The counter is initiated upon a first detection of a difference between the previously stored gear position and the new position determined in step 410 (address SHiFT). After one second, an indication of the new gear position is stored, and the new indication is used in comparing the result of step 410 to see if a change in the gear position is to be made.

In step 421, if a gear shift has not been determined control goes to step 430. If a gear shift change is required or still in progress (or, in the use of the counter, the predetermined time has not yet expired) control goes to a step 422. In step 430, the target line pressure for non gear shifting operation, viz., the target value of the vacuum for non gear shifting operation supplied to an actuator 140 (see FIG. 1(B)) for line pressure control, is set in the address OPTBST of the RAM 402.

The ROM 403 stores in a table, the data of FIG. 4 (line 301'), namely, the vacuum target values for non gear shifting operation, viz., the vacuum values which correspond directly to line pressure values in a relationship explained in connection with FIG. 4, as against the throttle opening degree (engine load) values. In the control example described hereinafter, one target vacuum value is stored as against each selected engine load value, but, if desired, as shown by the solid lines in FIG. 4, an upper limit and a lower limit value may be stored in the ROM 403 as against the selected engine load value.

Step 430 is made up of separate parts labeled 430a, 430b and 430c. In the step 430a, the CPU reads out the value for the throttle opening stored in the address THDAT within the RAM 402. In step 430b, a table lock up is effected utilizing the value of THDAT, and the corresponding value for the vacuum target value for the non-gear shifting operation is retrieved among the stored values of the ROM 403. In step 430c, the selected value for the vacuum target value which corresponds directly to the line pressure value is stored in the address OPTBST within the RAM 402.

After the completion of steps 430a, 430b and 430c, control goes to step 427 wherein a value zero (0) is stored in the address MODE which represents that the line pressure control for non-gear shifting operation is performed.

After the completion of the step 427, the program 400P returns to step 410 and is repeated.

If in step 421 a decision is made that a gear shift is to be made (or is not yet complete or the timer not timed-out), control goes to a step 422.

In the step 422, the content of the address SHiFT is examined and if a 1 to 2 upshift is stored therein, program control goes to step 424 and otherwise to step 423. In step 423, the control of SHiFT is examined, and if a 2 to 3 upshift indication is stored therein, program control goes to step 425 and otherwise to step 427.

In the step 424, the value 12 is stored in the address CHANGE within the RAM 402. In the step 425, the value 23 which indicates 2-3 upshift is stored in the address CHANGE within the RAM 402 in the same manner as in step 424, and subsequently control goes to step 426. If a decision is made that 1-2 upshift or 2-3 upshift is to be made as a result of the program steps 422, 423, 424 and 425, control goes to the step 426, while, if no gear shift is to be effected (this condition including in this embodiment 3-2 downshift and 2-1 downshift) control goes to the step 427.

In the step 426, the content of the address MODE within the RAM 402 is examined, and if the stored value is 0, control goes to a step 441. If the stored value is not 0, control goes to a step 451. The stored value of the address MODE becomes 1 or 2 in accordance with the progress of the control through the later described program 500 for line pressure control, wherein, the value 0 indicates that the line pressure control for non gear shifting is now being conducted.

Thus, as will be more clear in relation to FIGS. 7A, 7B and 13, control goes to step 426 when the line pressure control for gear shifting is to be initiated, and to step 451 when the line pressure control for gear shifting has been initiated but is not yet complete.

In the step 441, the address THKEEP of the RAM 402 stores the value for the throttle opening degree stored by the address THDAT within the RAM 402. The address THKEEP preserves its stored value until the line pressure control progressing along the later described program 500 terminates and a new gear shifting operation is initiated.

In step 441a, the value of THKEEP is read, and in step 441b a table lock-up operation is performed, similarly to the step 430b. The stored table data in this case corresponds to the data represented by line 304' of FIG. 4. Thus, in step 441b, the CPU reads a vacuum value corresponding to the throttle opening degree stored value in the address THKEEP. The vacuum value directly corresponds to the line pressure value associated with a 1-2 or 2-3 upshift.

In step 442, the CPU determines the hold time (TKEEP) for holding the low line pressure which was described in connection with FIGS. 7A and 7B, and a down time (TDOWN) for preventing a decrease in the line pressure during 2-3 upshift.

The various values for this holding time (TKEEP) and down time (TDOWN) are stored in ROM 403 in terms of table data corresponding to values plotted in FIGS. 14 and 15. In step 442, the CPU locks-up stored values corresponding to the stored value for the throttle opening degree within the address THKEEP of the RAM 402. It is understood that a different set of values may be separately stored in different addresses to be used for operation during 1-2 upshifting and 2-3 upshifting. However, for ease of explanation, program control is described using a single set of values for use in both 1-2 and 2-3 upshiftings.

The values looked-up in the step 442 are stored in step 443 the addresses TDOWN, OPTBEST and TKEEP, and subsequently, control goes to a step 444.

In the step 444, the value 1 is stored in the address MODE within the RAM 402.

If, in step 426, the value in address MODE is not equal to zero, the program goes to step 451. In step 451 a computation is made to determine a difference between the value which has been stored in the address THKEEP of the RAM 402 in the preceding step 441 and a value stored in the address THDAT of the RAM subsequently to this value, viz., a difference $\Delta\theta$ value = the address THDAT value − address THKEEP value, and this difference value $\Delta\theta$ is stored in the arithmetic operation resistor of the ROM 403.

In the subsequent step 452, if the difference value $\Delta\theta$ is not 0, control goes to step 453 wherein the stored value in the address THDAT of the RAM 402 is stored in the address THKEEP of the RAM 402 as a new throttle opening degree, and after the completion of this, control goes to step 454. If the difference value $\Delta\theta$ is 0, the program returns to step 410.

The ROM 403 stores vacuum correction values necessary for correction of line pressure values. The correction values are stored corresponding to difference values $\Delta\theta$ in the same manner as described in connection with FIGS. 9 and 10. In step 454 a correction amount $f(\Delta\theta)$ for the vacuum target value is determined from the difference value $\Delta\theta$ determined in the step 451, and this value $f(\Delta\theta)$ is added to the value stored in the address OPTBST, and this new value is stored in the OPTBEST in the place of the old value.

Based upon the values stored in the respective addresses OPTBST, TDOWN and TKEEP of the RAM 402 as a result of the control through the program 400P, the controls of gear shift and line pressure are carried out along with the program 500 which will be explained hereinafter.

Figure 13A:
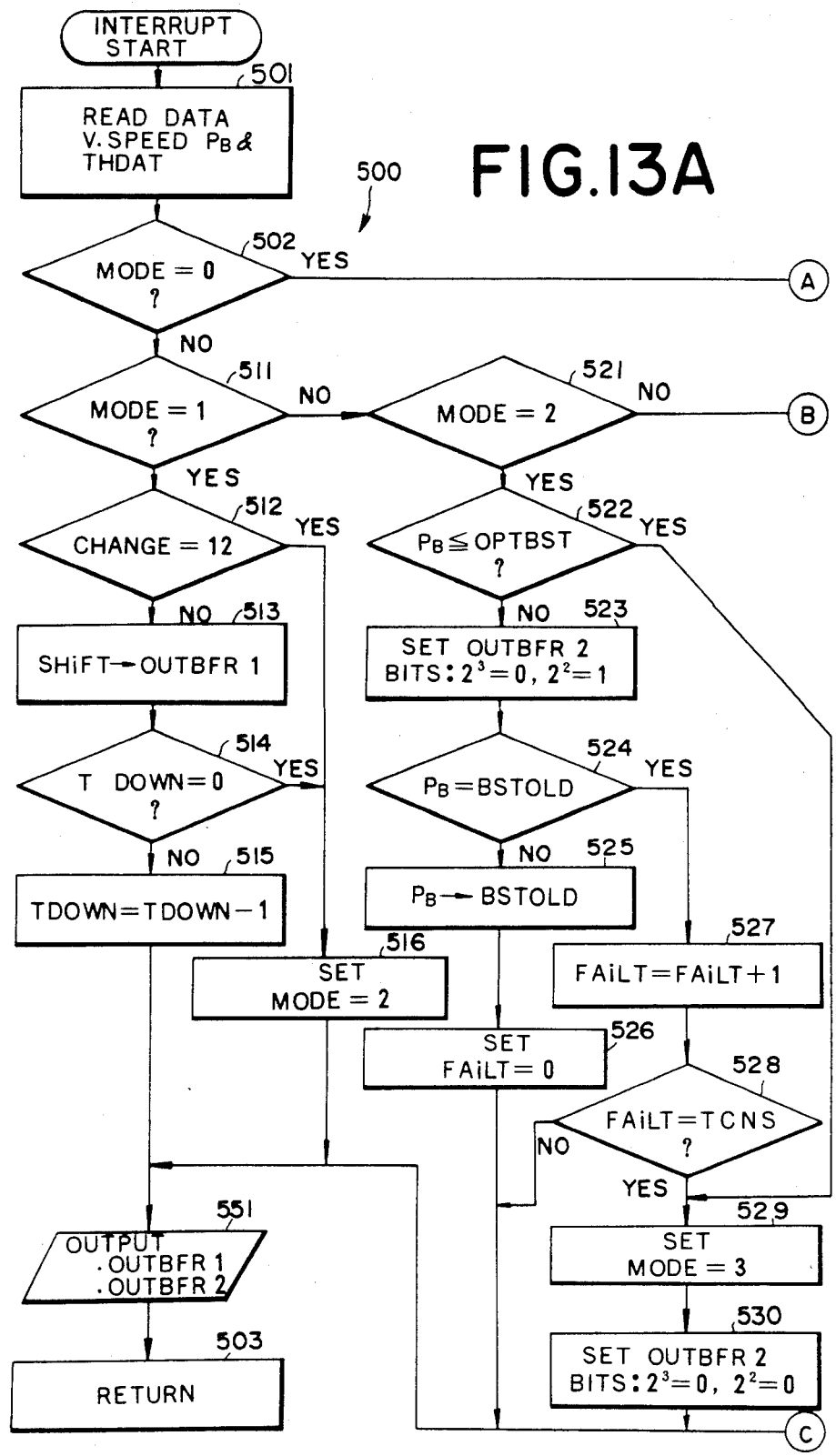
FIGS. 13A and 13B show a flow diagram illustrating the interrupt routine employed in the second embodiment shown in FIG. 11.
Figure 13B:
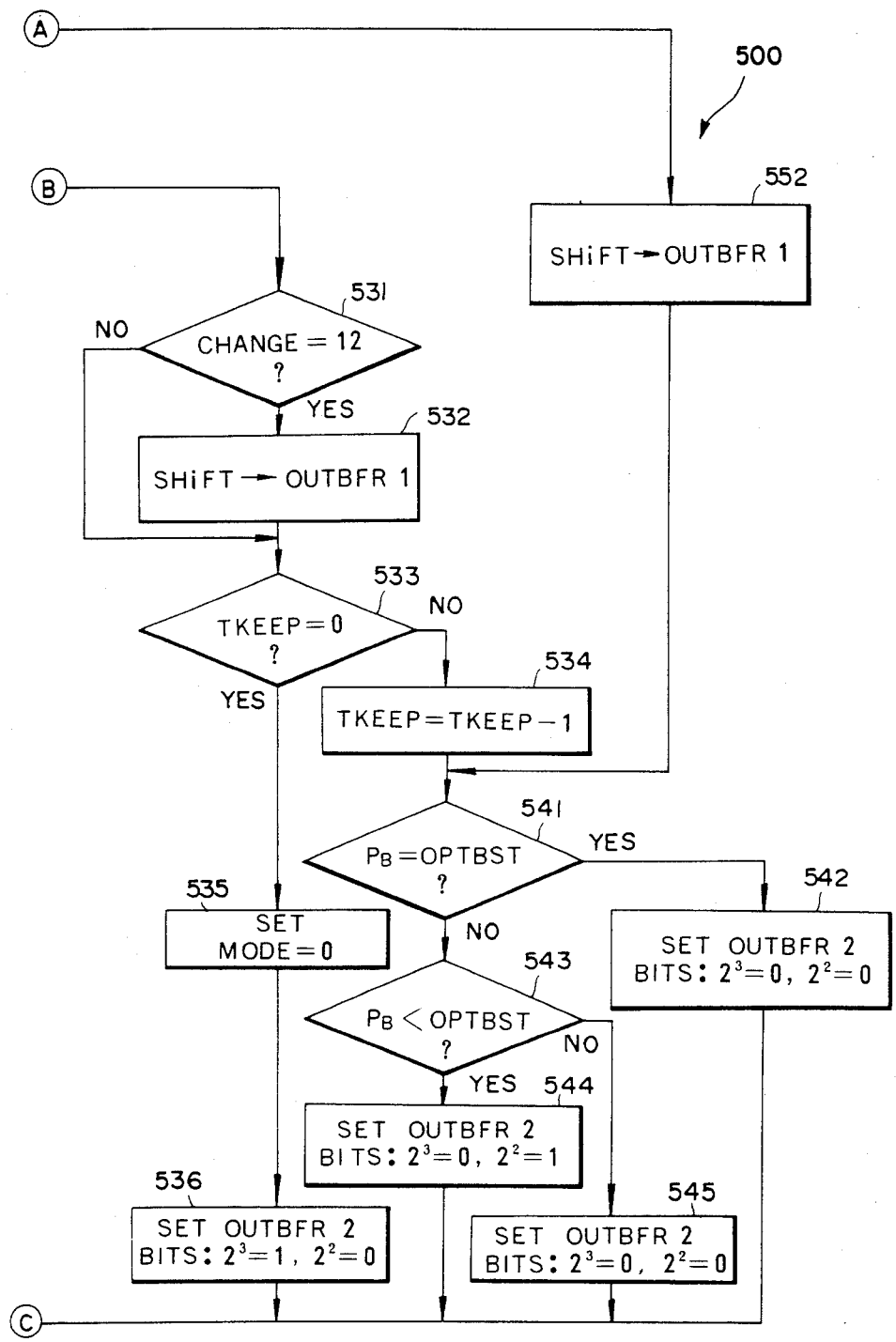

In the flow chart shown in FIGS. 13A and 13B illustrating the program 500, OUTBFR1, OUTBFR2, $P_B$, FAiLT and BSTOLD are names assigned to variable data memory addresses of the RAM 402 as shown in the table set forth above. OUTBFR1 and OUTBFR2 store drive instructions for the solenoids 141-142 and solenoids 143-144 respectively to be outputted through the PiA 404. As previously mentioned, program 500 assumes control whenever an interrupt signal is fed to the CPU by the timer 401.

In step 501, the input ports of the PiA 404 are read to permit storing of new values of the input data, namely new values of vehicle speed, while load stored in THDAT and line pressure stored in $P_B$.

In step 502, the value stored in the address MODE is examined, and if the value is 0, control goes to a step 552, while, control otherwise goes to step 511.

If in step 511 the value in the address MODE of the RAM 402 contains a 1 (via step 444 of the preceding program 400), control goes to step 512. By the time the step 512 assumes control, the gear shift state has been stored in the address SHiFT and the address CHANGE as a result of the control through he steps 410, 422, 423, 424 and 425. Further, value necessary for the line pressure control has been stored in the respective addresses as a result of the control through the steps 442 and 443.

Thus, all of the information necessary for the initiation of the gear shifting is ready. In the step 512, the address CHANGE is examined, and if the value corresponds to a 1-2 upshift control goes to step 516 where a value of 2 is stored in the address MODE. If the content of the address CHANGE is other than the value 12 (corresponding to a 1-2 upshift), the program goes to step 513.

Since in the present embodiment, as previously described in connection with the steps 424 and 425, the address CHANGE stores only indications of a 1-2 upshift or 2-3 upshift, control goes to step 513 only if 2-3 upshift is required. In the step 513, the gear ratio to be shifted is transferred to OUTBFR1 of the RAM 402, so as to get it ready for outputting through the PiA 404. This gear shift position was previously determined in the step 410 of the program 400, viz., the content (OFF insruction for 1-2 shift solenoid and OFF instruction for 2-3 shift solenoid) of the address SHiFt of the Ram 402.

In the subsequent steps 514 and 515, a setting is made of a time TDOWN by which the initiation of decreasing the line pressure is delayed, viz., a time between $t_0'$ and $t_0$ as described in the explanation of the previous embodiment in connection with FIG. 7(B).

The count down of the counter TDOWN is made during each pass through the interrupt routines 500 as initiated by the timer 401. The initial value of TDOWN was set in steps 442 and 443 of the previously described program 400P. A unit count value is subtracted from TDOWN each time program step 515 is executed which occurs with each clock interrupt as long as MODE=1 and CHANGE=23.

Referring to gear shifting control, the content (OFF instruction for 1-2 shift solenoid 141, OFF instruction for 2-3 shift solenoid 142) stored in the address OUTBFR in the step 513 is outputted through the PiA 404 in the step 551. The buffer OUTBFR1 is outputted at the beginning of mode 1 (at time t'o in FIG. 7(B) and continues throughout until a new gear shift position is required.

If, in step 514, the value in the address TDOWN is 0, control goes to a step 516 wherein the value in the address MODE is changed to 2, allowing the control to go to a next step in the line pressure control.

In the next cycle through the interrupt rountine 500, the content of address MODE is 2, and in step 521 the content of MODE is examined and program control branches to step 522. In step 522 the value of the address $P_B$ is examined and compared with OPTBST. $P_B$ vacuum value supplied to the diaphragm 140 (FIG. 1(B)), and OPTBST, determined in step 442, is the vacuum value corresponding to the target low line pressure.

If the value of the address $P_B$ is not smaller than the value of the address OPTBST, the vacuum is low and, consequently, the level of the line pressure is excessively high. In this case control goes to a step 523. In the step 523, a value of bit $2^3=0$ (OFF for the atmosphere solenoid 144), and bit $2^2=1$ (ON for vacuum solenoid 143) is stored in the address OUTBFR2. Under this condition, after passing through the subsequent steps 524, 525 and 526, the content stored in the address OUTBFR2 in the step 523 is outputted through the PiA 404 in the step 551, causing the vacuum solenoid 144 to be turned ON, thus starting to admit the vacuum to diaphragm 140, resulting in a decrease in the line pressure.

This action continues through subsequent passes through the interrupt routine 500 until the value of the address $P_B$ is smaller than or equal to the value of the address OPTBST. During this process, the abnormality of the line pressure control which is later described may be detected in the steps 524, 525, 526, 527 and 528.

In the step 524, a decision is made whether or not the value of the address $P_B$ is egual to the value of the address BSTOLD, viz., the value of the address $P_B$ upon the preceding clock pulse. If they are equal to each other, control goes to a step 527, and if not, control goes to the step 525.

The steps 527 and 528 cooperate with each other to detect an abnormal state of the line pressure control. The abnormal state occurs during MODE=2 if the value of the address $P_B$ does not change from its previous value BSTOLD for a predetermined time FAiLT. In step 527 the value 1 is added to the value of the address FAiLT. Then, in the step 528, the value of the address FAiLT is compared with a predetermined value $T_{CNS}$ and if they are equal to each other, the line pressure control in MODE 2 is suspended, allowing the control to go to a step 529, and if not, program control goes to a step 551, which maintains the line pressure control in MODE 2.

Therefore, steps 527 and 528, are used to determine if the value of $P_B$ is constant for a predetermined time, namely $T_{CNS}$ which indicates a fault operatin of MODE 2 and thus the program is forced into a MODE 3 operation in step 529. Step 530, subsequent to step 529, is used to set the output buffer OUTBFR2 to store $2^3=0$ (OFF for atmosphere solenoid 144) and $2^2=0$ (OFF for vacuum solenoid 143) thus no further line pressure control until MODE 3 is entered.

If, in the step 524, the line pressure has changed, the value of the address $P_B$ replaces the value of the address BSTOLD in a step 525, and the address FAiLT is cleared to a zero value in a step 526. In the case the line pressure control continues to decrease as shown by MODE 2 of FIGS. 7A and 7B until the value of the address $P_B$ is lower than the value of the address OPTBST.

The decrease in line pressure control as described above continues until, in step 522, the line pressure has decreased lower than or is equal to the predetermined value OPTBST. In this event the program goes to step 524 and thus to step 520 as previously described.

Since the value of the address MODE is now 3 (step 529) control goes through the steps 502, 511 and 521 to step 532.

In the step 531, a decision is made whether the value 12 has been stored in the address CHANGE of the RAM (in the step 424 of the flow chart shown in FIG. 12) and if the value 12 is stored, control goes to a step 532 wherein SHiFT is stored in OUTBFR1, namely $2^0 = 0$ (OFF for 2-3 shift solenoid 142) and $2^1 = 1$ (ON for 1-2 shift solenoid 141) are stored in OUTBFR1. Control then goes to step 533.

If the address CHANGE does not store the value 12, control goes directly to step 533.

The step 533 cooperates with the step 534 to determine a time for holding the low line pressure (stored in OPTBST) as described in connection with FIGS. 7(A) and 7(B) based upon the value which has been stored in the address TKEEP of the RAM 402 in the main program 400P. More precisely, the value of the address TKEEP is reduced by 1 in step 534 each time the interrupt routine is conducted, viz., each time a cock interrupt pulse is fed to the CPU. When the value of the address TKEEP becomes 0 as determined in step 533, the value of the address MODE is changed to 0 in a step 535, and the line pressure control during the gear shifting is effective by setting the output buffer OUTBFR2 such that bits $2^3 = 2^2 = 0$ in step 536.

As long as the subtraction is being conducted in the step 534, the line pressure is maintained at a pressure for the gear shifting which corresponds to the vacuum target value stored in OPTBST by means of the control through steps 541, 542, 543, 544 and 545.

In the step 541, a comparison is made between the value of the address OPTBST and the value of the address $P_B$, and if they are equal to each other, control goes to the step 542, while, if not, control goes to step 543.

In the step 542, the buffer OUTBFR2 stores zero in bit position $2^3$ (OFF for the atmosphere solenoid 144) and bit position $2^2$ (OFF for the vacuum solenoid 143). Thus, the line pressure control terminates after the control has gone through the step 551. On the other hand, if, in the step 543, it is decided that the value of the address $P_B$ is not larger than the value of the address OPTBST, viz., the line pressure is lower than the target low line pressure, control goes to step 544 wherein the buffer address OUTBFR2 stores bit position $2^3 = 1$ (ON for the atmosphere solenoid 144) and $2^2 = 0$ (OFF for the vacuum solenoid 143). If the value of the address $P_B$ is not smaller than the value of the address OPTBST, viz., when the line pressure is higher than the target low line pressure, the control goes to step 545 wherein the address OUTBFR2 stores bit position $2^3 = 0$ (OFF for atmosphere solenoid 144) and $2^2 = 1$ (ON for vacuum solenoid 143).

The values stored in the OUTBFR2 in the steps 544 and 545 are carried out via the PiA in step 551.

During the non gear shifting operation, the value of the address MODE is 0 as set in step 427 in the program 400P, so that if, in step 502, a decision is made that the value of the address MODE is 0, control goes to step 552. In step 552, the content of SHiFT which has been determined in step 410 is transferred to the address OUTBFR1, and control goes to step 541. In step 541 and the subsequent steps to this, the control is substantially the same as previously described, viz., the atmosphere solenoid 144 and vacuum solenoid 143 are operated until the vacuum agrees with the value stored in the address OPTBST. In this case, the value of the address OPTBST used in the step 541 is the value determined in the step 430 of the program 400P.

What is claimed is:

1. A hydraulic pressure control system for reducing shift-shock in an automatic transmission during a change of gear positions, said automatic transmission including a change speed gearing mechanism connected to an output shaft of an engine, hydraulically operated friction means for causing the change speed gearing mechanism to change gear positions, a hydraulic pressure regulating valve for adjusting the magnitude of hydraulic pressure to be supplied to the hydraulically operated friction means, shift valve means for supplying the hydraulic pressure to the friction means, said hydraulic pressure control system comprising:

(a) means for generating an engine load signal representative of the magnitude of a load on the engine;

(b) means for generating an actually measured hydraulic pressure signal representing a measured value of said hydraulic pressure;

(c) means responsive at least to said engine load signal for generating a gear change command signal in accordance with a predetermined relationship between gear position and at least said engine load signal;

(d) means responsive to said gear change command signal and said engine load signal for generating a target low hydraulic pressure signal indicative of a desired hydraulic pressure determined from a predetermined relationship between engine load and hydraulic pressure, said desired hydraulic pressure being lower than the hydraulic pressure normally operative when no change in gear position is required as determined by said predetermined relationship between gear position and at least said engine load signal;

(e) means responsive to said gear change command signal for generating a pressure level holding signal representing a holding time; and (f) means responsive to said measured hydraulic pressure signal and said target low hydraulic pressure signal for controlling said hydraulic pressure regulating valve for maintaining the measured value of said hydraulic pressure equal to the magnitude of said desired hydraulic pressure for said predetermined holding time represented by said pressure level holding signal.

2. A hydraulic pressure control system as claimed in claim 1, further comprising a comparator means for comparing said actually measured hydraulic pressure signal and said target low hydraulic pressure signal and for generating an output signal when said actually measured hydraulic pressure signal is substantially equal to said target low hyddraulic pressure signal, and wherein said pressure level holding signal generating means is triggered by said signal from said comparator means and starts to generate said pressure level holding signal.

3. A hydraulic pressure control system as claimed in claim 1 or 2, wherein said target low hydraulic pressure signal generating means include a memory means responsive to said gear change command signal for storing that value of said engine load signal upon generation of said gear change command signal and further comprising means for correcting said target low hydraulic pressure signal in response to a difference between said engine load signal and the value of said engine load signal stored to said memory means.

4. A hydraulic pressure control system as claimed in claim 1, wherein said pressure level holding signal generating means determines said holding time in response to said engine load signal.

5. A hydraulic pressure control system as claimed in claim 1, further comprising means for suspending the generation of said target low hydraulic pressure signal when said actually measured hydraulic pressure signal stays generally constant for a predetermined time.

6. A hydraulic pressure control system for reducing shift shock in an automatic transmission, the automatic transmission including a change speed gearing mechanism operatively connected to an engine and having a plurality of gear positions and being shiftable therebetween, and friction means operative by a hydraulic pressure for causing the change speed gearing mechanism to establish one of the plurality of gear positions, said hydraulic pressure control system comprising:

means for generating an engine load signal indicative of a load on the engine;

means for generating an actual hydraulic pressure signal indicative of the actual hydraulic pressure supplied to the friction means;

means responsive at least to said engine load signal for generating a gear change command signal in accordance with a predetermined shift schedule;

means for generating a target hydraulic pressure signal indicative of a desired hydraulic pressure;

means for adjusting the magnitude of the hydraulic pressure supplied to the friction means so as to bring said actual hydraulic pressure signal into substantial agreement with said target hydraulic pressure signal;

said target hydraulic pressure signal generating means being shiftable between a first state where the target hydraulic pressure signal indicates a first desired hydraulic pressure for non-gear shifting operation and a second state where the target hydraulic pressure signal indicates a second desired hydraulic pressure for gear shifting operation, said second desired hydraulic pressure for gear shifting operation being lower than said first desired hydraulic pressure for non-gear shifting operation;

means responsive to said gear change command signal for causing said target hydraulic pressure generating means to shift from said first state thereof into said second state thereof;

means for generating a timer actuating signal when said actual hydraulic pressure signal is brought into substantial agreement with said target hydraulic pressure signal under a condition where said target hydraulic pressure generating means assumes said second state thereof;

means responsive to said timer actuating signal for generating a timer signal for a predetermined time ($T_{KEEP}$); and means responsive to an absence of said timer signal for causing said target hydraulic pressure signal generating means to shift into said first state thereof.

7. A hydraulic pressure control system for reducing a shift shock in an automatic transmission, the automatic transmission including a change speed gearing mechanism operatively connected to an engine and having a plurality of gear positions including a first gear, a second gear and a third gear and being shiftable therebetween, and friction means operative by a hydraulic pressure for causing the change speed gearing mechanism to establish one of the plurality of gear positions, and shift valve means for supplying the hydraulic pressure to the friction means, said hydraulic pressure control system comprising:

means for generating an engine load signal indicative of a load on the engine;

means for generating an actual hydraulic pressure signal indicative of the actual hydraulic pressure supplied to the friction means;

means responsive at least to said engine load signal for generating a first to second gear change command signal and a second to third gear change command signal in accordance with a predetermined shift schedule;

means for generating a target hydraulic pressure signal indicative of a desired hydraulic pressure;

means for adjusting the magnitude of the hydraulic pressure supplied to the friction means so as to bring said actual hydraulic pressure signal into substantial agreement with said target hydraulic pressure signal;

said target hydraulic pressure signal generating means being shiftable between a first state where the target hydraulic pressure signal indicates a first desired hydraulic pressure for non-gear shifting operation and a second state where the target hydraulic pressure signal indicates a second desired hydraulic pressure for gear shifting operation, said second desired hydraulic pressure for gear shifting operation being lower than said first desired hydraulic pressure for non-gear shifting operation;

means responsive to said first to second gear change command signal for causing said target hydraulic pressure generating means to shift from said first state thereof into said second state thereof upon generation of said first to second gear change command signal;

means responsive to said first to second gear change command signal for actuating the shift valve means to initiate a shifting from the first to the second gear upon expiration of a first predetermined time ($T_{HOLD}$) after generation of said first to second gear change command signal;

means responsive to said second to third gear change command signal for actuating the shift valve means to initiate a shifting from the second gear to the third gear upon generation of said second to third gear change command signal;

means responsive to said second to third gear change command signal for causing said target hydraulic pressure generating means to shift from said state thereof into said second state thereof upon expiration of a second predetermined time ($T_{DOWN}$) after generation of said second to third gear change command signal;

means for generating a timer actuating signal when said actual hydraulic pressure signal is brought into substantial agreement with said target hydraulic pressure signal under a condition where said target hydraulic pressure generating means assumes said second state thereof;

means responsive to said timer actuating signal for generating a timer signal for a third predetermined time ($T_{KEEP}$); and means responsive to an absence of said timer signal for causing said target hydraulic pressure signal generating means to shift into said first state thereof.

* * * * *